(12) United States Patent
Johnson et al.

(10) Patent No.: US 11,513,031 B2
(45) Date of Patent: Nov. 29, 2022

(54) CONFORMANCE TEST APPARATUS, SENSOR SYSTEM, AND PROCESSES

(71) Applicant: Aktiebolaget SKF, Gothenburg (SE)

(72) Inventors: Douglas Johnson, Aberdeen, WA (US); Michael Ingram, Lansdale, PA (US); Greg Ziegler, Lansdale, PA (US); Soenke Petersen, Edwardsville, IL (US)

(73) Assignee: AKTIEBOLAGET SKF

( * ) Notice: Subject to any disclaimer, the term of this patent is extended or adjusted under 35 U.S.C. 154(b) by 280 days.

(21) Appl. No.: 16/665,030

(22) Filed: Oct. 28, 2019

(65) Prior Publication Data

US 2021/0123832 A1 Apr. 29, 2021

(51) Int. Cl.
| | |
|---|---|
| *G01R 31/34* | (2020.01) |
| *G01M 13/045* | (2019.01) |
| *H02P 23/14* | (2006.01) |
| *G01M 13/026* | (2019.01) |
| *G01M 15/02* | (2006.01) |
| *G01M 13/028* | (2019.01) |

(52) U.S. Cl.
CPC ........ *G01M 13/045* (2013.01); *G01M 13/026* (2013.01); *G01M 13/028* (2013.01); *G01M 15/02* (2013.01); *H02P 23/14* (2013.01)

(58) Field of Classification Search
CPC ............. G01M 13/045; G01M 13/026; G01M 13/028; G01M 15/02; H02P 23/14
See application file for complete search history.

(56) References Cited

U.S. PATENT DOCUMENTS

| | | | | |
|---|---|---|---|---|
| 6,262,550 B1* | 7/2001 | Kliman | .............. | G05B 23/0264 318/565 |
| 6,646,561 B1* | 11/2003 | Zur | .................... | G01R 31/3647 324/435 |
| 2004/0034483 A1* | 2/2004 | Sonnichsen | ......... | G01M 13/028 702/56 |
| 2004/0251895 A1* | 12/2004 | Eidenvall | .............. | G01M 15/06 324/207.15 |
| 2008/0234964 A1* | 9/2008 | Miyasaka | .............. | F16C 19/527 702/113 |

(Continued)

FOREIGN PATENT DOCUMENTS

WO WO-2020094334 A1 * 5/2020 ............... F04D 1/06

*Primary Examiner* — John E Breene
*Assistant Examiner* — Christine Y Liao
(74) *Attorney, Agent, or Firm* — Reed Smith LLP

(57) ABSTRACT

Conformance testing of a rebuilt motor includes disposing a motor under test in a motor test stand, coupling a plurality of sensors to the motor under test including a first vibrational sensor to the motor under test; a first temperature sensor to the motor under test; a first rotational speed sensor to the motor under test. A set of test parameters are received comprising parameters for a conformance test, the test parameters including a vibrational sensor parameter, a temperature sensor parameter, and a rotational speed parameter. A motor under test is placed in an on-state and a processing device receives sensor data simultaneously from the sensors, determines that the rotational speed satisfies the rotational speed parameter, and stores time sampled sensor data received from the plurality of sensors relative to a time zero corresponding to a time when the rotational speed satisfies the rotational speed.

7 Claims, 15 Drawing Sheets

(56) References Cited

U.S. PATENT DOCUMENTS

| | | | |
|---|---|---|---|
| 2008/0313006 A1* | 12/2008 | Witter | H02J 13/00017 |
| | | | 705/7.17 |
| 2009/0025466 A1* | 1/2009 | Moritani | G01M 15/02 |
| | | | 73/114.01 |
| 2010/0174576 A1* | 7/2010 | Naylor | G06Q 10/04 |
| | | | 701/31.4 |
| 2011/0246151 A1* | 10/2011 | Djelassi | G01K 7/42 |
| | | | 703/2 |
| 2018/0062552 A1* | 3/2018 | Donolo | H02P 29/60 |
| 2019/0203729 A1* | 7/2019 | Nishimura | F04D 15/0077 |
| 2020/0041571 A1* | 2/2020 | Propp | G01R 31/346 |

\* cited by examiner

802 dispose a rebuilt motor in a motor test stand 804 couple a plurality of sensors to the rebuilt motor 806 receive a set of test parameters from a remote processing device 808 place the rebuilt motor in an on-state causing rotational motion in a shaft of the rebuilt motor 810 receive sensor data from a plurality of sensors 812 determine that a rotational speed of the rebuilt motor satisfies a rotational speed test parameter 814 store time sampled data received from the plurality of sensors relative to a time zero 816 generate and store a set of time correlated derived values from the time sampled data 818 transmit the stored time sampled data received to a remote processor for storage in a data store 820 transmit the stored time correlated derived values to a remote processor for storage in a data store 822 generate a display comprising indicators corresponding to one or more test parameters

CONFORMANCE TEST APPARATUS, SENSOR SYSTEM, AND PROCESSES

FIELD

This disclosure is directed to the technological field of rebuilt motor test stands. In particular, this disclosure is directed to techniques for detection of bearing malfunctions or other malfunctions in rotary machinery

BACKGROUND

A critical aspect of rebuilding an industrial motor is verifying that a rebuilt motor satisfies specific tolerances and performance criteria. Ensuring that a rebuilt motor meets performance tolerances is critical, because a malfunctioning rebuilt motor can create safety concerns for personnel working near a rebuilt motor in operation and because such a rebuilt motor can cause further damage to downstream or upstream mission critical machinery.

Sensor integrators, like SKF's IMx-16Plus, provide the ability to simultaneously sense multiple channels of sensor data in a time correlated fashion and to transmit such data to remote data processing systems. Data warehouses, like SKF's @ptitude Observer, allow data to be stored and provide an interface allowing analysis or monitoring of such data.

BRIEF DESCRIPTION OF THE DRAWINGS

The following drawings illustrate aspects of various inter-related preferred embodiments in accordance with this disclosure.

FIG. 5 illustrates an exemplary data structure storing a time zero characterization in accordance with this disclosure.

FIG. 6 illustrates an exemplary data structure storing a time zero characterization in accordance with this disclosure.

FIG. 7 illustrates an exemplary data structure storing a time zero characterization in accordance with this disclosure.

FIG. 8 illustrates a flow chart detailing an exemplary process in accordance with this disclosure.

FIG. 10 is an illustration of an exemplary user interface display of a rebuilt motor test stand in accordance with this disclosure.

FIG. 15 illustrates aspects of an exemplary data structure storing a time zero characterization in accordance with this disclosure.

DETAILED DESCRIPTION

Disclosed are one or more embodiments that incorporate features of this invention. The disclosed embodiment(s) merely exemplify the invention. The scope of the invention is not limited to the disclosed embodiments. Rather, the invention is defined by the claims hereto.

Figure 1:
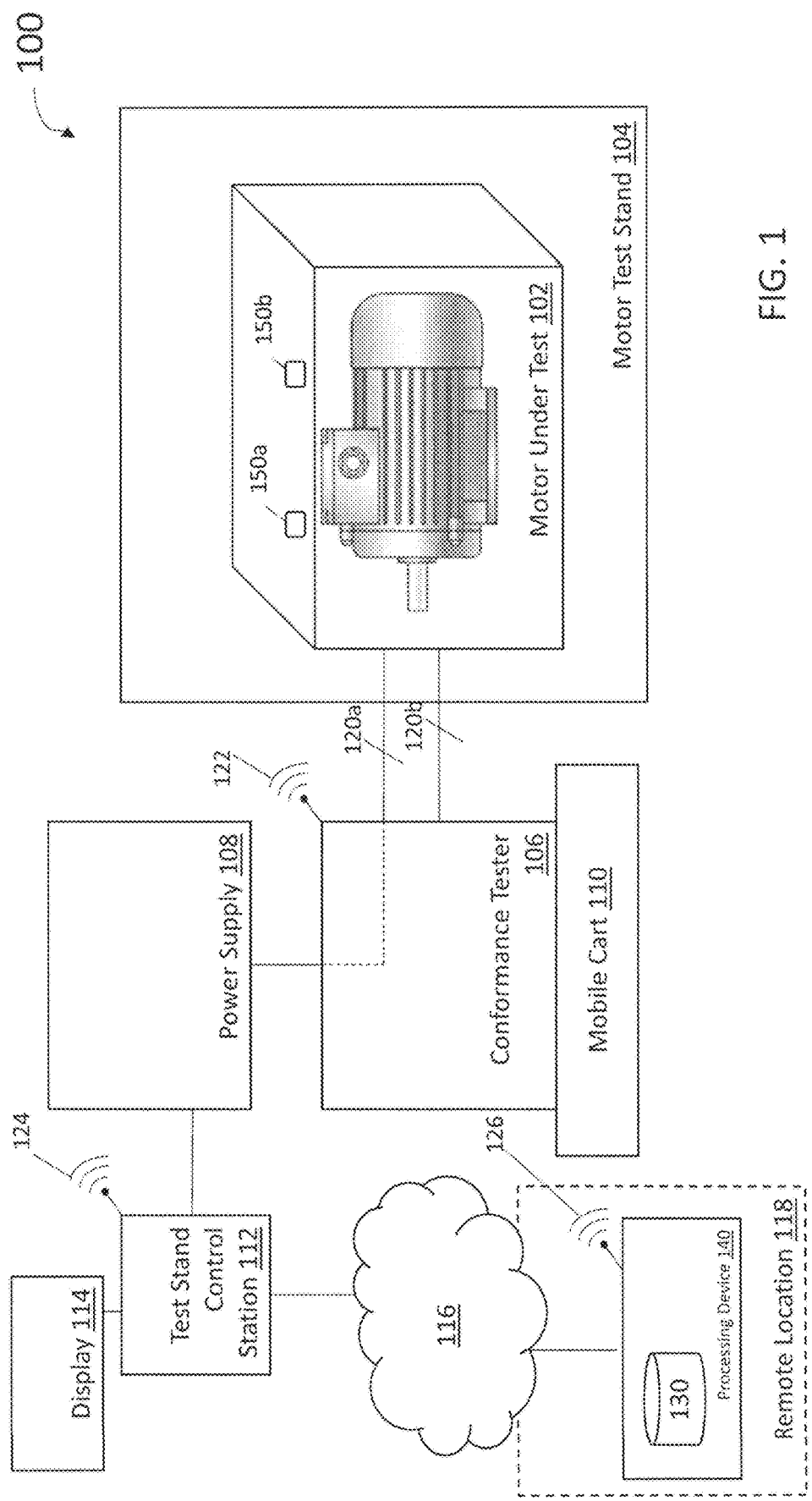
FIG. 1 is a functional block diagram illustrating aspects of a rebuilt motor test stand in accordance with this disclosure.

FIG. 1 illustrates aspects 100 of various embodiments of a rebuilt motor test stand in accordance with this disclosure. A rebuild motor under test 102 is disposed within motor test stand 104. Power is supplied to the rebuilt motor under test 102 by one or more power cables 120*a* coupling power supply 108 to the motor under test 102. A test stand control station 112 is configured to initiate a test run of the rebuilt motor under test 102. A user interface of the test control station 112 enables a user to initiate a test run of the motor under test and includes at least one display 114 for providing user feedback before, during, and after a test run. In some embodiments a display, e.g., 114, is a touch screen display, in other embodiments separate input devices (not particularly illustrated) are provided, e.g., a keyboard and mouse. Upon reading this disclosure, one will appreciate that there are many ways to initiate a rebuilt motor test run to perform an initial run of a rebuilt motor under test, e.g., 102. For example, an initial run of a newly rebuilt electric motor under test, e.g., 102, may be initiated by engaging a power supply 108 to provide power to such a motor under test, thereby placing such a motor in an on-state thereby energizing a stator in a drive end of a motor causing rotational motion in a shaft of a rotor.

Motors, e.g., 102, may include, among other things, bearing housings in both a drive and a non-drive end of a motor, which include a plurality of bearings and lubrication. During a first run of such a rebuilt motor, components of such a motor undergo thermal growth causing a rebuilt motor's physical behavior to vary over an initial period of time during an initial run until such a motor's thermal state reaches a stable state and thermal growth completes. A rebuilt motor's first run is a critical time period in the life of a motor, and thermal growth may lead to catastrophic consequences. In standard motor rebuild shops, it is best practice to shield workers from a rebuilt motor under tests, e.g., 102, to protect workers from catastrophic failure during a first run. Short of critical failure, a motor's first run may demonstrate a variety behavior between when a motor is first turned on and when a motor's thermal state achieves steady state. However, without simultaneously sensing motor behavior across multiple domains in a time correlated manner, such behavior may not be observed, or may require highly skilled engineers be present during tests to recognize. While motors experience thermal growth in subsequent runs from a cold start, such growth poses less risk after a first run, because a successful first run indicates that future expected thermal growth will be similar and acceptable.

Thus, two critical steps in the motor rebuild lifecycle process are (1) a newly rebuilt motor's, e.g., 102, first run and (2) performance tests to ensure that a newly rebuilt motor meets, or conforms, to an motor rebuilds' specifications and meets or exceeds performance test criteria. During a first run, a rebuilt motor components, e.g., bearings, and forces within a motor, e.g., lubricant pressure, or conditions, e.g., lubricant condition, may change over time as components of such a rebuilt motor experience thermal growth.

Historically, conformance testing has been an ad-hoc process comprising a variety of individual measurements, often performed during a multiple of test runs without any correlation of test data, because no known conformance test processes or test stands exist that employ a time correlated data acquisition system when testing rebuilt motors. Furthermore, known methods risk catastrophic failure, because known systems and processes fail to account for symptoms arising in one conformance test domain, such as temperature, when testing in a second test domain, such as physical vibration. And, while conformance testing is a critical step in motor rebuilding, it is often the case that results are overlooked unless and until a failure occurs within a rebuilt motor. Once failure of a rebuilt motor, e.g., 102, occurs, conformance test results are often strictly scrutinized. But, with known ad hoc processes based on subject criteria, conformance test results are often unreliable and of limited value.

Additionally, typical operators of an motor rebuild test stand, e.g., 104, while highly skilled in motor rebuilding, are typically unskilled in designing complicated test plans and processes for testing parameters of such test plans. This is especially so when test parameters involve derived values obtained by various processes or derived from cross domain relationships, e.g., a change in temperature experienced close in time with an unbalanced drive current. Furthermore, conformance tests are labor intensive in an environment that typically include many distractions for personnel, including large machinery operating at high volumes, some of which poses safety hazards if not managed and operated properly. Therefore, reducing time test-stand operators are required to interact with test devices, e.g., configuring tests and logging results, leads to increased safety within a rebuild shop and higher quality conformance test results.

As illustrated in FIG. 1, a conformance test apparatus 106 in connection with this disclosure addresses these deficiencies in known rebuild motor test stand technologies, by providing a single test tool, e.g., 106, that provides reliably consistent tests capable gathering time correlated data from a plurality of domains as dictated by a single test configuration.

In some embodiments, a conformance test apparatus, e.g., 106 includes a plurality of sensors configured to be disposed on a motor under test 102, and coupled to a conformance test device, e.g., 106, by a plurality of cables, e.g., cables 120. A plurality of cables 120b, may couple exemplary conformance test apparatus 106 to a variety of sensors, e.g., sensors 150a, 150b, that includes, without limitation, vibrational sensors (e.g., single axis mass accelerometers, tri-axial mass accelerometers, or the like), temperature sensors (e.g., surface resistance temperature detectors, thermistors, embedded temperature detectors, or the like), tachometers, current sensors, voltage sensors, or any suitable sensor for testing a requisite domain.

As illustrated in FIG. 1, in embodiments, a power supply, e.g., 108, supplies power to a motor under test 102 via one or more power cables 120a. A conformance test device, e.g, 106, may be configured to receive power cables 120a, which in some embodiments are three power cables bearing three-phase supply currents. Once received, conformance tester 106 may be configured to include one or more current sensors that may be disposed upon one or more power cables 120a within conformance test device 106 in order to sense each current carried by power cables 120a. By receiving power cables 120a in a conformance test device 106 and sensing currents within conformance test device 106, user safety and the overall safety of a rebuild shop is increased. A motor under test, e.g., 102, may require high current/high voltage power be supplied, thus current sensors disposed on high power bearing cables are maintained within a housing of a conformance test, e.g., 106, to reduce risk of exposed wiring presenting a shock hazard.

Because a conformance test apparatus 106 may support a rebuild shop with many rebuild motor test stands, e.g., 104, a conformance tester may be provided on a mobile cart, e.g., 110. In exemplary embodiments, to increase mobility of a conformance test device, interfacing with a conformance test device, e.g., 106, occurs wirelessly through a wireless transceiver, e.g., 122, operating a wireless protocol, such as required by WIFI, Bluetooth, GSM, LTE, or any suitable wireless communications standard. By operating wirelessly, a conformance test apparatus, e.g., 106, receives test set up parameters and offloads sensor data wireless via a wireless transceiver 122. Thus, a device may be configured by a local processing machine, e.g., a processing machine of a test stand, such as the test stand control station 112. A test stand control station may be configured with a wireless transceiver, e.g., 124. For example, a conformance test device 106 may communicate over a wireless WIFI network via wireless transceivers 122 and 124 with a local processing machine, e.g., 112. Alternatively, a conformance test device may be configured from a remote location, e.g., remote location 118 having a processing device, e.g., 140, configured with a wireless device, e.g., 126, configured to communicate with exemplary conformance test device 106 via a GPS network. Upon reading this disclosure, one will appreciate that any suitable wirelessly networked processing device may be configured to transmit test parameters or receive test results from a conformance test device, e.g., 106, in accordance with this disclosure.

Alternatively, a local processing device, e.g., 112, may communicate with a remote device, e.g., 140, running one or more applications for remotely interfacing to conformance tester 106. Such an exemplary remote application may be provided under a SaaS model, accessible by test stand control station 112 via network 116. For example, a remote processing device 140 may provide a web server based application accessible via a web browser executing on test stand control station 112. In this way, a user may configure a test (as discussed further below) and issue test parameters from remote location 118 using a web browser (or other client software) executing locally on test stand control station 112 (or another suitable processing device). A conformance test device 106 may be further configured to collect test results of a test run and transmit such results to remote location 118. In embodiments, once received in a remote location 118, e.g., by a processing device 140, they may be stored in a remote data store 130 by remote processing device 140. In some embodiments, such a remote data store 130 is a relational database, a non-relational database, or any suitable data structure. In some embodiments, remote data store 130 is an indelible ledger. In an exemplary embodiment, remote data store 130 includes a block chain.

In some embodiments, a conformance test is configured as a set of test parameters that are transmitted to exemplary conformance tester 106. Once received by exemplary conformance tester 106, test parameters may be stored thereby configuring a conformance test device, e.g, 106, to be primed to receive a trigger signal and responsive to a trigger signal a conformance test device, e.g., 106, may carry out a conformance test in accordance with the stored test parameters, and upon test completion, conformance tester 106 may return to a wait state until it again receives a trigger signal indicating a start of a new test. During such a conformance test, sensor data is gathered, e.g., via input cables 120a, 120b, and transmitted via wireless transceiver 122 to be stored, e.g., in remote data store 130. In this way, once configured for a particular conformance test, a rebuilt motor test stand operator need only initiate a test run, e.g, from test stand control station, and exemplary conformance tester 106 performs a conformance test without any additional user input from a rebuild shop operator. In this way, user interaction with conformance test device 106 is minimized.

In embodiments, display 114 is configured with indicators to alert shop personnel of one or more detected conditions. In some embodiments display 114 displays fault indicators corresponding to one or more test parameters indicative of a critical condition, e.g., a sensed vibration exceeds a vibrational parameter on a vibration sensor channel. This way, an operator may be notified of a potentially catastrophic condition or another fault condition. In some embodiments, display 114 displays status indicators. For example, an indicator may change from yellow to green when a sensed temperature remains stable for three consecutive samples sampled according to a sample frequency of one sample per minute. In some embodiments, a test stand control station 112 includes multiple displays, and at least one display, e.g., 114, is large and mounted so that it is easily visible to all rebuild shop personnel. In some embodiments, a large display is provided by an entirely separate processing device configured to receive or retreive conformance test results; such results may be received or retrieved from a remote data store, e.g., 130, or, alternatively, directly from conformance tester 106.

It is often the case that a motor rebuild shop regularly rebuilds, and thus tests, a same model of motor on a regular basis. For example, a motor under test 102 may be of a type of motor regularly tested for (1) current imbalances between three-phases of a three-phase input power supply, (2) bearing housing temperature on both a drive end and on a non-drive end, and (3) three axes of vibration of both a drive end and a non-drive end. Such a motor under test would be tested using a plurality of sensors disposed in predetermined locations on each such motor tested, e.g., a motor of a same type as motor under test 102. Thus, an initial conformance test may be configured only once and loaded into conformance tester 106. Configuring of such a test for a specific model of motor may be carried out locally or remotely based on where a skilled engineer is located, rather than requiring that such an engineer be present in a rebuild shop. Once test parameters of a conformance test plan are loaded into a conformance test apparatus, e.g., 106, a motor rebuild shop operator need only dispose the requisite sensors upon a motor under test 102 according to predetermined locations and initiate a test run of the rebuild motor under test. A conformance test will then automatically be performed by a properly configured conformance tester 106 with little or no additional interaction by such an operator. And a set of time correlated sensor data describing such a motor's first run is captured and wirelessly transmitted, e.g., via transceiver 122, to a remote data store, e.g., 130, also with little or no interaction by an operator.

By being configured to automatically perform a conformance test according to a conformance test plan responsive to a trigger signal a motor test run may be initiated by shop personnel according to normal methods, and a conformance test is performed automatically; the results being offloaded from exemplary conformance tester 106 and stored in a non-transitory data store 130 where it may be permanently stored, accessed, and analyzed by data analysis tools as needed. In embodiments, as explained further below, an exemplary conformance test plan includes a set of test parameters describing what sensor channels to sense data from, how often data is sensed from each channel, and how to respond to various parameter thresholds (as further discussed below).

Figure 2:
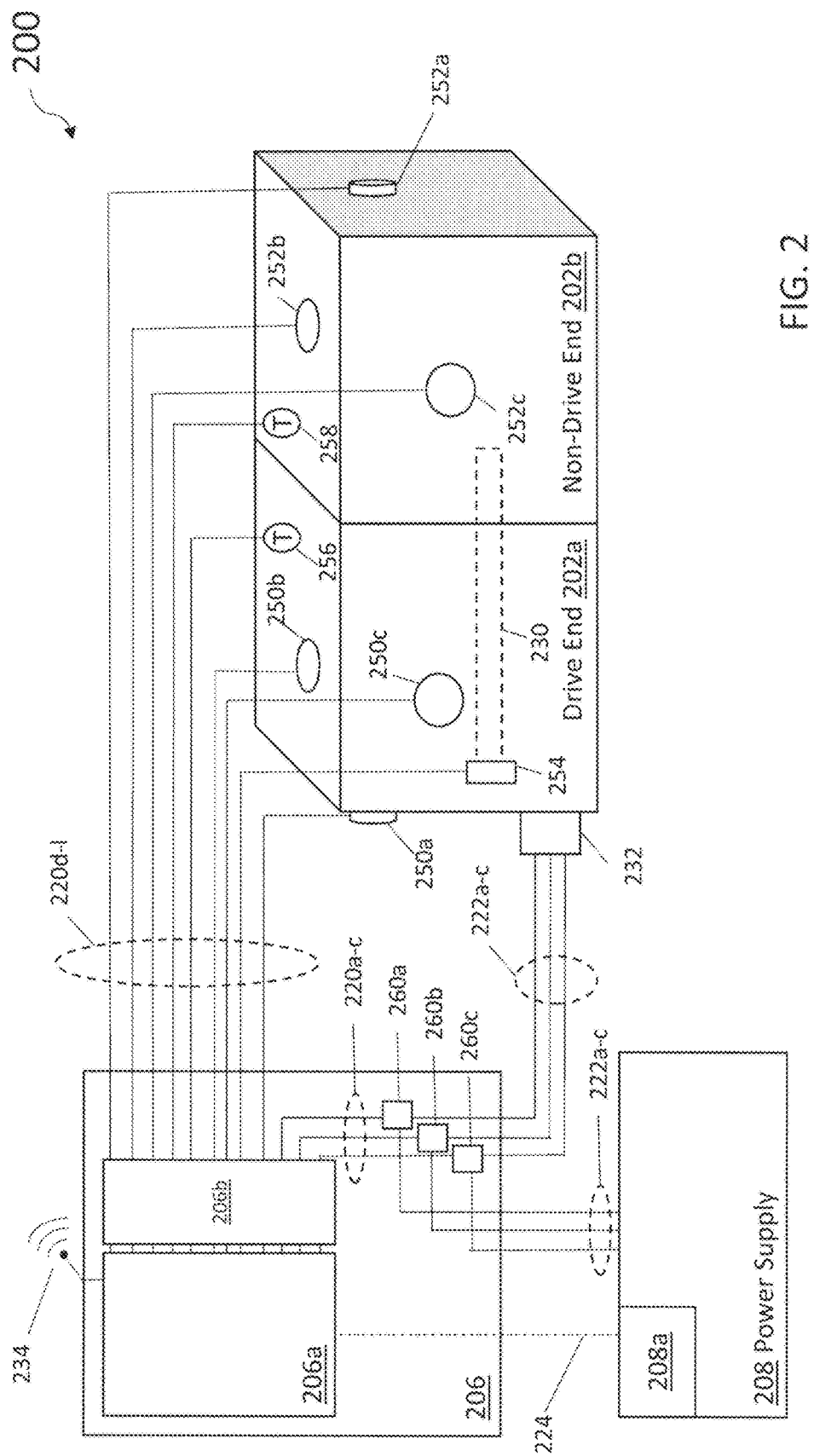
FIG. 2 is a functional block diagram illustrating aspects of various embodiments of a rebuilt motor conformance testing apparatus in accordance with this disclosure.

FIG. 2 is a block diagram illustrating aspects 200 of an exemplary embodiment of a rebuilt motor conformance testing apparatus 206 in accordance with this disclosure. A rebuilt motor conformance testing apparatus 206 includes an integrator 206a having a plurality of inputs for receiving a plurality of sensor signals via cables 220a-1. In embodiments, one or more sensor cables 220a-1 are communicatively coupled to integrator 206a through intermediate circuitry 206b, which may include one or more wires, cables, traces, filters, A/D converters, signal conditioners, optoelectric converters, amplifiers, circuit breakers, or integrated circuits. In embodiments, an integrator 206a includes a plurality of sensed signal inputs configured to accept an analog voltage varying in a voltage range, e.g., 0-5 V, 0-10 V, 0-100V, 10-20V, or any suitable voltage range as dictated by available components. In embodiments, an integrator, e.g., 206a, is configured to accept a 4-20 mA, 0-10V signal as input on one or more analog channels. An integrator 206a may further include one or more digital inputs according to one or more digital standards, e.g., RTZ or NRTZ or RS-232 or RS-485. One will appreciate upon reading this disclosure that intermediate circuitry 206 may be designed as needed based on the particular integrator components and sensor components used and based on a particular test application requirements.

Rebuilt electric motor conformance test apparatus 206 is configured to perform conformance testing of an electric motor 202 comprising a drive end 202a and a non-drive end 202b, where drive end 202a receives a three phase power input from power supply 208 via power cables 22a-c and via power input connector 232 in order to energize a stator (not particularly illustrated) thereby imparting rotational movement in a shaft 230 of motor 202.

Rebuilt electric motor conformance test apparatus 206 includes an isolated compartment for receiving power cables 222a-222c into conformance test apparatus 206. Conformance test apparatus 206 further comprises a plurality of sensors including six single axis mass accelerometers: three single axis mass accelerometers 250a-250c configured to measure vibrational movement in a horizontal axis 250a, an axial axis 250b, and a vertical axis 250c of a drive end 202a of a motor under tests 202; and three single axis mass accelerometers 252a-252c configured to measure vibrational movement in a horizontal axis 252a, an axial axis 252b, and a vertical axis 252c of a non-drive end 202b of a motor under tests 202. In embodiments, mass accelerometers are 100 mV/g low mass accelerometers. In some embodiments, they are configured with attachment magnets for mounting to a surface of a rebuilt motor under test.

Rebuilt electric motor conformance test apparatus 206 further includes at least two temperature sensors 256, 258 respectively configured to measure a temperature of a drive end 202a and a temperature of a non-drive end 202b of a rebuilt motor under test 202. A temperature sensor such as 256 or 258 may be a resistance temperature detector (RTD) or other suitable temperature sensor. In embodiments, temperature sensors 256, 258 are embedded temperature sensors. In embodiments, conformance test apparatus 206 includes one or more cables configured to communicatively couple to one or more sensor points in a motor body that are in turn communicatively coupled to one or more embedded temperature sensors. In embodiments, intermediate circuitry 206b includes a PT-100 type signal conditioner and transmitter for interfacing to PT100-type RTDs built into a bearing babbit of a motor under test, e.g., 202.

An exemplary rebuilt motor conformance test apparatus 206 may further include at least one tachometer 254 for measuring rotational speed of a rotor shaft, e.g., 230, of a motor under test. In embodiments, tachometer 254 is a digital optical tachometer or a laser based tachometer configured to sense rotational movement. Exemplary tachometer 254 provides a digital signal to apparatus 206, and is received by integrator 206a via a digital input. In embodiments, exemplary rebuilt motor test conformance apparatus 206 is configured to monitor an input signal from tachometer 254 to detect rotational motion within motor under test 202 in order to trigger conformance testing, causing integrator 206a to sample and store sensed data from a plurality of sensors of apparatus 206. In embodiments, sensor data from tachometer 254 indicates that rotational motion has exceeded a threshold, integrator 206a senses and stores an initial value from each of a plurality of sensors of apparatus 206 as a time zero sample, and all subsequent samples until conformance test completion are stored together with time zero samples as an initial run characterization data structure, or a time zero characterization, as discussed further below.

Exemplary rebuilt motor conformance test apparatus 206 further includes at least one current sensor 260a-260c, which may be configured to be coupled to power cables 222a-222c. A current sensor 260a-260c may sense a power current from power supply 208 and provide a voltage output. Step down transformers and solid state devices are readily available that are capable of stepping a sensed voltage down from 480 VAC to a range of 0-10 VAC. In some embodiments, a current transformer is a 0-200 A current transformer outputting a 0-10 VAC output. In some embodiments a current transformer is a 0-400 A current transformer providing an output of 0-10 VAC.

In embodiments, a voltage output of current sensor 260a-260c may be in a range acceptable to integrator 260a, but in other high power applications, intermediate circuitry 206b may require additional step down components. Current sensors 260a-260c may be coupled to integrator 206a via cables 220a-220c and intermediate circuitry 206b. Alternatively, rather than sense current directly from power cables 222a-c, apparatus 206 may interface directly to a power supply read out 208a, which may be configured to provide real time current values to integrator 206a, e.g., through communications interface cable 224. In embodiments, a rebuilt motor conformance test apparatus 206 may be cable of sending a control signal to power supply 208 to initiate power output to cables 222a-222c thereby initiating a test run of rebuilt motor 202. In some embodiments, integrator 206a is configured with networking inputs and outputs capable of receiving a network signal from wireless network antenna 234 for receiving test parameters. Integrator 206a is further configured to transmit sensed data to a remote data store, e.g., 130, via wireless antenna 234.

Figure 3:
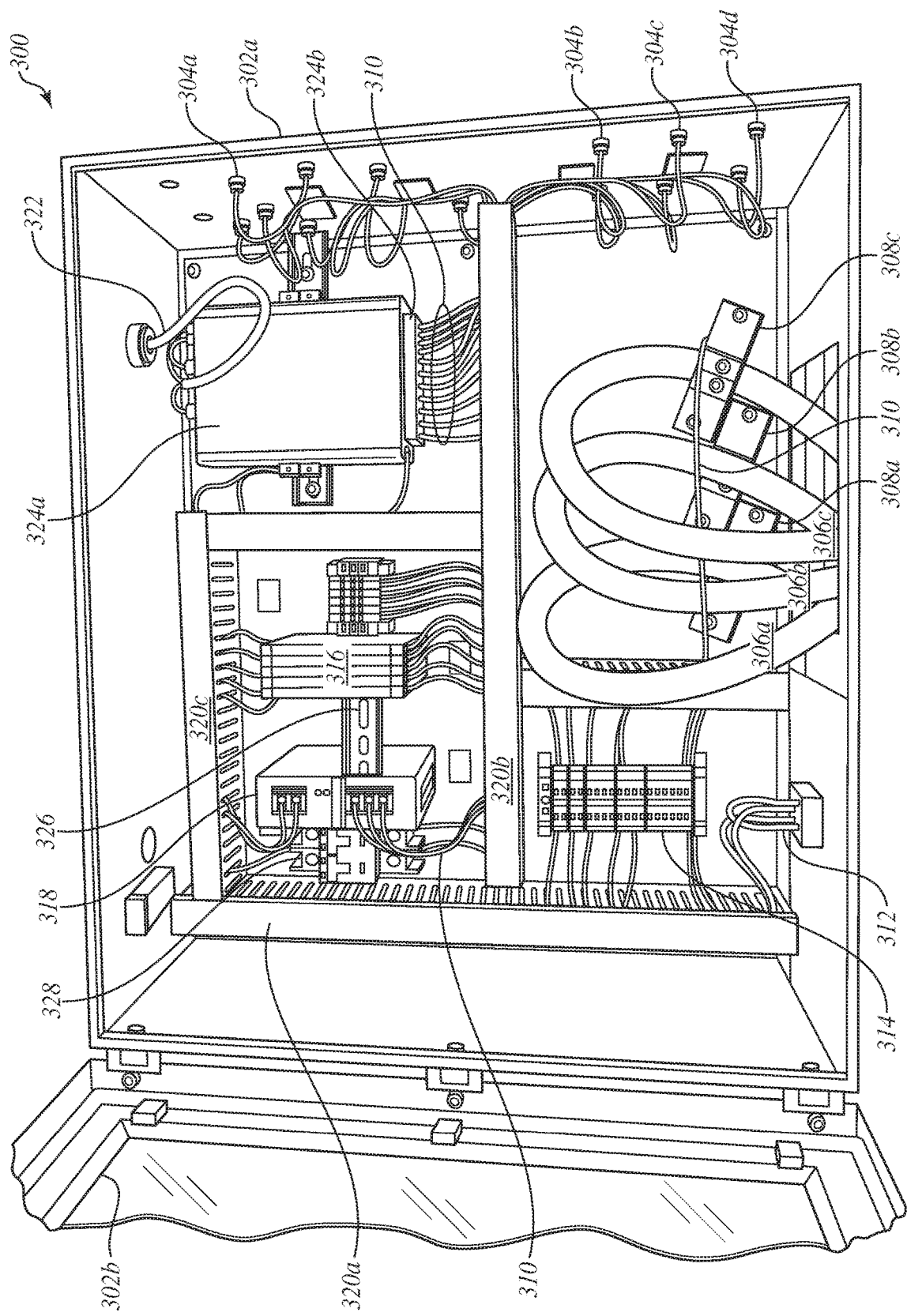
FIG. 3 is a diagram illustrating aspects of various embodiments of a rebuilt motor conformance testing apparatus in accordance with this disclosure.

FIG. 3 illustrates aspects 300 of one exemplary embodiment of a conformance test apparatus in accordance with this disclosure. These aspects 300 include a hosing 302 comprising a housing body 302a and a housing cover 302b, which housing 302 may be a NEMA housing or any suitable housing for use in an industrial setting. A variety of inputs 304a-304d accept cable inputs from a plurality of sensors (not particularly illustrated here). Three power cables 306a-306c carrying a three-phase power current to a motor under test, e.g, 102, 202, may be received into housing 302 where cables 306a-306c are each coupled to current transformers 308a-308c each providing a voltage signal between 0-10V via a plurality of input wires 310 to inputs 324b of integrator 324a. In some embodiments, integrator 324a is an SKF IMx Multilog System. An exemplary conformance test apparatus includes a power input 312 for providing power to power supply 318 for powering active components, such as integrator 324a, or signal conditioners 316, provided for conditioning signals from PT-100 type RTD devices. Various wires 310 may be organized using various wireways, e.g., 320a, 320b and 320c, and terminal blocks 314 for routing wires throughout a test apparatus. One or more power/circuit breakers 328 may be used to protect the components of aspects 300 of a test apparatus. Aspects 300 may include various components, e.g., 316, 318, may mounted within hosing 302 using housing mounts 326. In some embodiments, integrator 324 receives a wireless network signal via a wireless network antenna cable 322. Integrator 324 is capable of receiving test parameters of a conformance test via cable 322 and transmit time correlated data from a plurality of sensors via cable 322.

Figure 4:
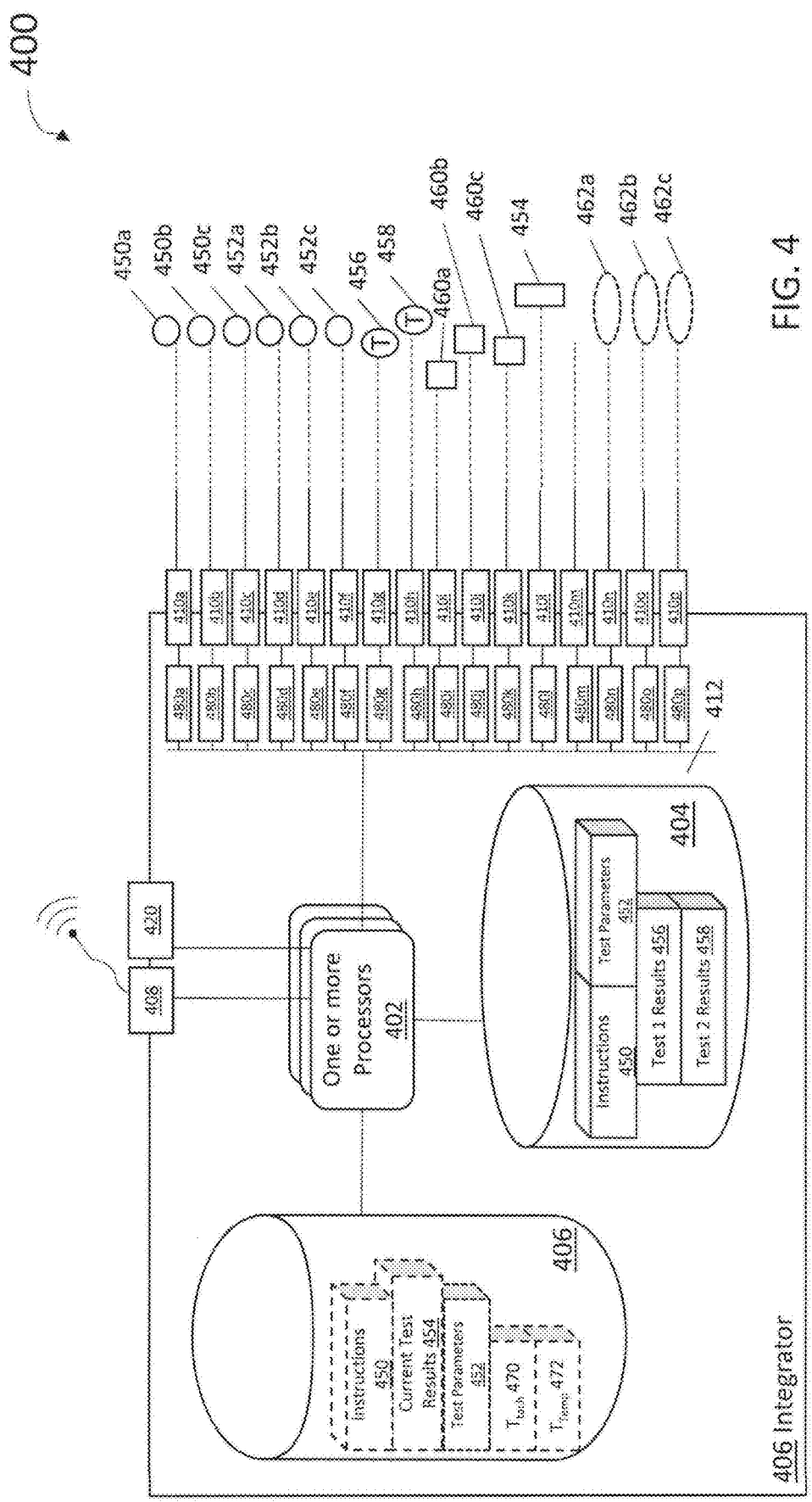
FIG. 4 is a functional block diagram illustrating aspects of an embodiment of a rebuilt motor conformance testing apparatus in accordance with this disclosure.

FIG. 4 illustrates aspects of 400 one exemplary embodiment of a conformance test apparatus integrator 406 in accordance with this disclosure. An integrator 400 comprises a plurality of processors 402 coupled to a transitory memory 406 and a non-transitory memory 404 storing instructions 450 in accordance with this disclosure. Processors 402 are further communicably coupled to a wireless transceiver circuit 408, which may for example be WIFI, but may also be cellular enabled and capable of transmitting, e.g., on a GSM network or the like. In embodiments, processors are further communicably coupled to one or more additional I/O circuits, which may e.g., be an Ethernet port, RS-232 port, or other physical I/O circuit for sending and receiving data or commands.

In embodiments, integrator 406 may include a plurality of sensor channels 480a-480p, which may include digital sensor channels, e.g., 480l, and analog sensor channels, e.g., 480a-480f. In a non-limiting embodiment, each channel may simultaneously receive sensor data from a corresponding input 410a-410p. Each channel 480a-480p includes various signal conditioning components necessary to convert sensor inputs to an appropriate computer readable signal capable of being processed and stored. For example, analog inputs such as 410a-410f provide sensor signals to sensor channels 480a-480f each of which may include an A/D converter, a sampling circuit for capturing time sampled data, a buffer to collect captured samples, and one or more logic gates for providing time sampled data to a communications bus 412 shared by a plurality of sensor channels, and communicatively coupled to one or more processors 402, which may store test results in memory as current test results 454 in memory. One will appreciate that channels 480a-480p may include any suitable circuitry for conveying sensor data from a sensor input 410a-410p to a computer processor in a suitable computer readable form.

In exemplary embodiment, a conformance test is received as a set of performance test parameters 452, which may be stored in a transitory memory 406 or non-transitory memory 404. Test parameters 452 may include a set of test channels from test channels 480a-480p that will be actively sampled during a test, together with one or more test conditions and thresholds. For example, a test parameter 452 may specify a rotational speed that must be sensed, e.g., by tachometer 454, in order to trigger a conformance test. In embodiments a rotational speed is received and stored in current test results 454 as revolutions per minute. In embodiments, a rotational speed parameter of the test parameters 452 requires a minimum revolutions per minute (RPM) to trigger a conformance test run. In embodiments, a rotational speed parameter requires a minimum RPM of 1700 RPM, 1000 RPM, 800 RPM or 100 RPM, or 10 RPM, or 1 RPM, or 0.1 RPM. It will be appreciated that such a minimum RPM to trigger a conformance test may be motor specific, and will depend on various design factors.

In embodiments, when instructions 450 cause one or more processors 402 to determine that a rotational speed parameter has been satisfied, e.g., met or exceeded, one or more processors receive sampled data from sensor data channels 480a-480p, as dicated by test parameters 452. Accordingly current test results 454 will store time sampled data extending from time zero and continuing until test completion, which may occur when a test parameter is satisfied. For example, in embodiments a test parameter specifies that a test completion occurs when a temperature sensed by both temperature sensors 456, 458 remain stable for six consecutive sampling periods, where a sampling period is determined by a sample period test parameter of test parameters 452. In some embodiments, each channel, e.g., 480a-480p, may have a uniquely specified sampling period, while in other embodiments each channel 480a-480p is sampled according to a globally specified sample period. When a test completion parameter is satisfied, one or more processors may store any remaining buffered sensor values in current results 454.

In an embodiment, a set of test parameters 452 enables sensing on channels 480a-480l and 480n-480p, and accordingly current test results 454, after test completion, constitute a time zero characterization of a rebuilt motor under test, including sensor values from vibration sensors 450a-450c, 452a-452c, temperature sensors 456, 458, current sensors 460a-460c, tachometer 454, and embedded PT-100 type RTD sensors, which may, e.g., be embedded within a stator of a motor under test. In embodiments, upon test completion instructions 450 cause one or more processors to attempt to transmit current test results via 408 to a remote data store, e.g., 130. If a network is unavailable current test results 450 may be stored in a non-transitory memory 404 together with historic conformance tests test 1 results 456 and test 2 results 458. Responsive to one or more signals, in some embodiments, one or more flags may be generated based on sensed data, e.g., $T_{tach}$ 470 or $T_{Temp}$ 472. Such flags may indicate the start or end of a conformance test, or may be used in processing test results, e.g., 454, to create a time zero data structure. Such results may generally be persistently or transitorily stored independently, or stored in connection with a set of test results, e.g., as part of test 1 results 456 or test 2 results 458.

Figure 5:
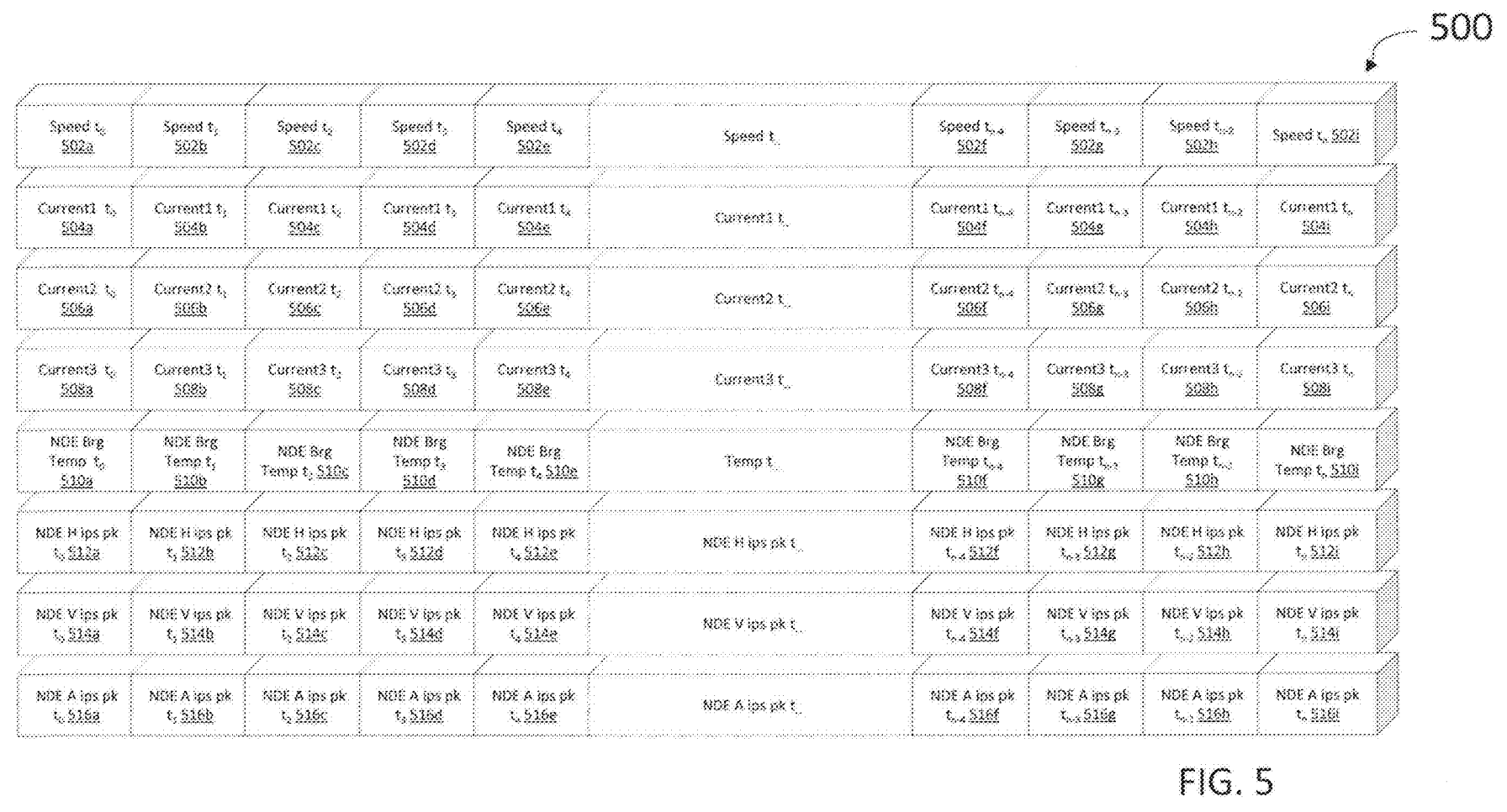

FIG. 5 illustrates an exemplary data structure storing a time zero characterization 500 of a rebuilt motor under test based on sampled data obtained during a first run of a rebuilt motor under test. The exemplary time zero characterization 500 illustrated in FIG. 5 comprises a data structure organized by sensor data channel. The time zero characterization comprises a set of time zero (t0) sensor samples 502a, 504a, 506a, 508a, 510a, 512a, 514a, and 516a. In embodiments each time zero sample corresponds in time to when a rotational speed in a motor under test exceeds a speed test parameter.

The time zero characterization further includes a set of time sampled sensor data extending from time zero (t0) samples to test completion samples (tn). Exemplary time zero characterization 500 includes a set of time sampled speed data samples 502a-502i, a set of time sampled first current data samples 504a-504i, a set of time sampled second current data samples 506a-506i, a set of time sampled third current data samples 508a-508i, a set of time sampled NDE bearing temperature data samples 510a-510i, a set of time sampled NDE horizontal vibration samples 512a-512i, a set of time sampled NDE vertical vibrational samples 514a-514i, and a set of time sampled NDE axial vibrational samples 516a-516i. In embodiments, a test apparatus, e.g, 206, transmits exemplary time zero characterization 500 to a remote data store for long-term storage, where it is made accessible for analysis. In embodiments, an exemplary time zero characterization 500 is stored for the duration of a rebuilt motor's lifespan.

Figure 6:
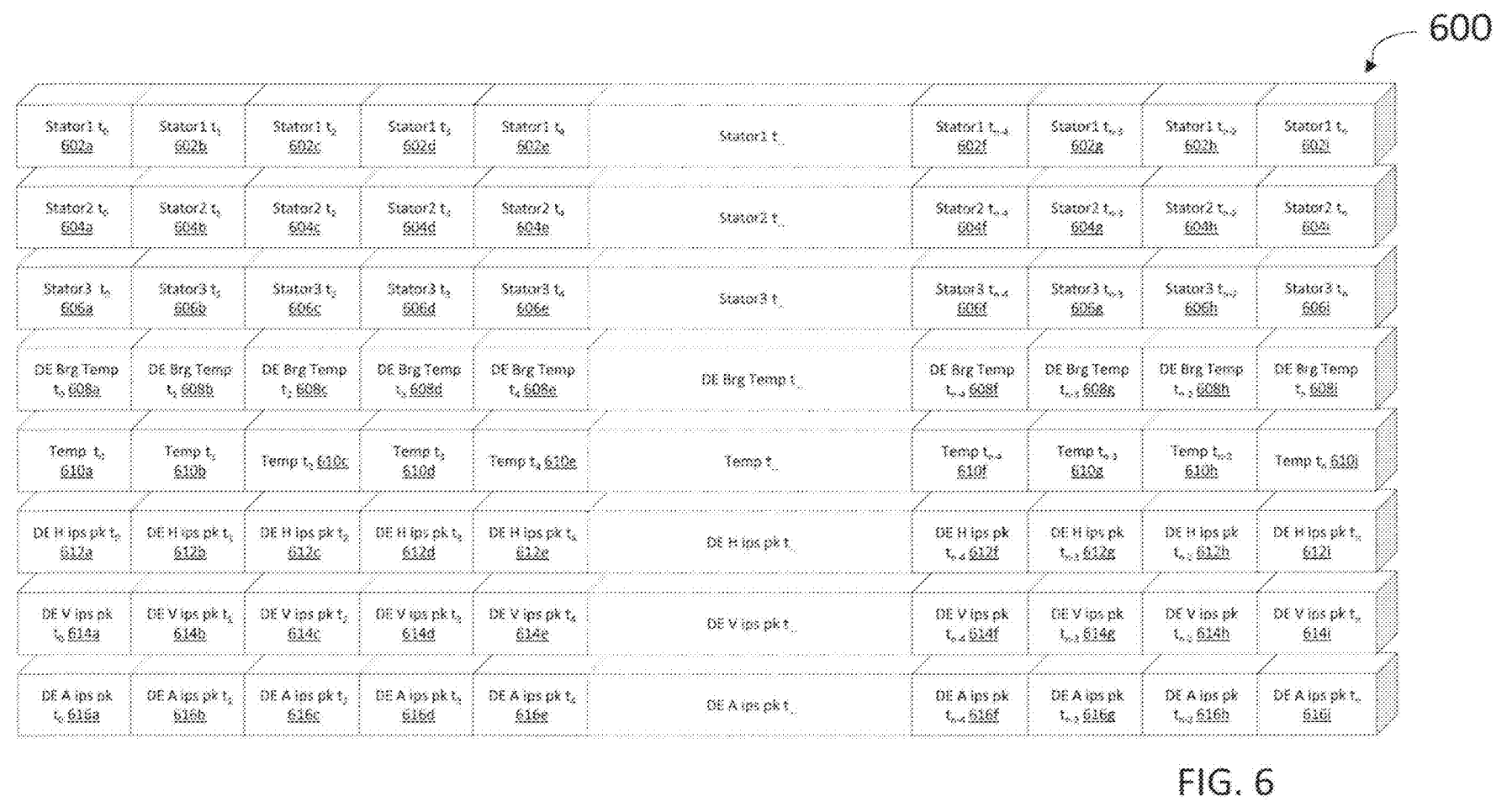

FIG. 6 illustrates another exemplary data structure storing a time zero characterization 600 of a rebuilt motor under test based on sampled data obtained during a first run of a rebuilt motor under test. Exemplary characterization 600 may be part of exemplary characterization 500, or it may be separate and distinct from characterization 500.

The exemplary time zero characterization 600 illustrated in FIG. 6 comprises a data structure organized by sensor data channel. The time zero characterization comprises a set of time zero (t0) sensor samples 602a, 604a, 606a, 608a, 610a, 612a, 614a, and 616a. The time zero characterization further includes a set of time sampled sensor data extending from time zero (t0) samples to test completion samples (tn). Exemplary time zero characterization 500 includes a set of time sampled first stator temperature data samples 602a-602i, a set of time sampled second stator temperature samples 604a-604i, a set of time sampled third stator temperature data samples 606a-606i, a set of time sampled DE bearing temperature data samples 608a-608i, a set of motor surface mounted temperature data samples 610a-610i, a set of time sampled DE horizontal vibration samples 612a-612i, a set of time sampled DE vertical vibrational samples 614a-614i, and a set of time sampled DE axial vibrational samples 616a-616i.

Figure 7:
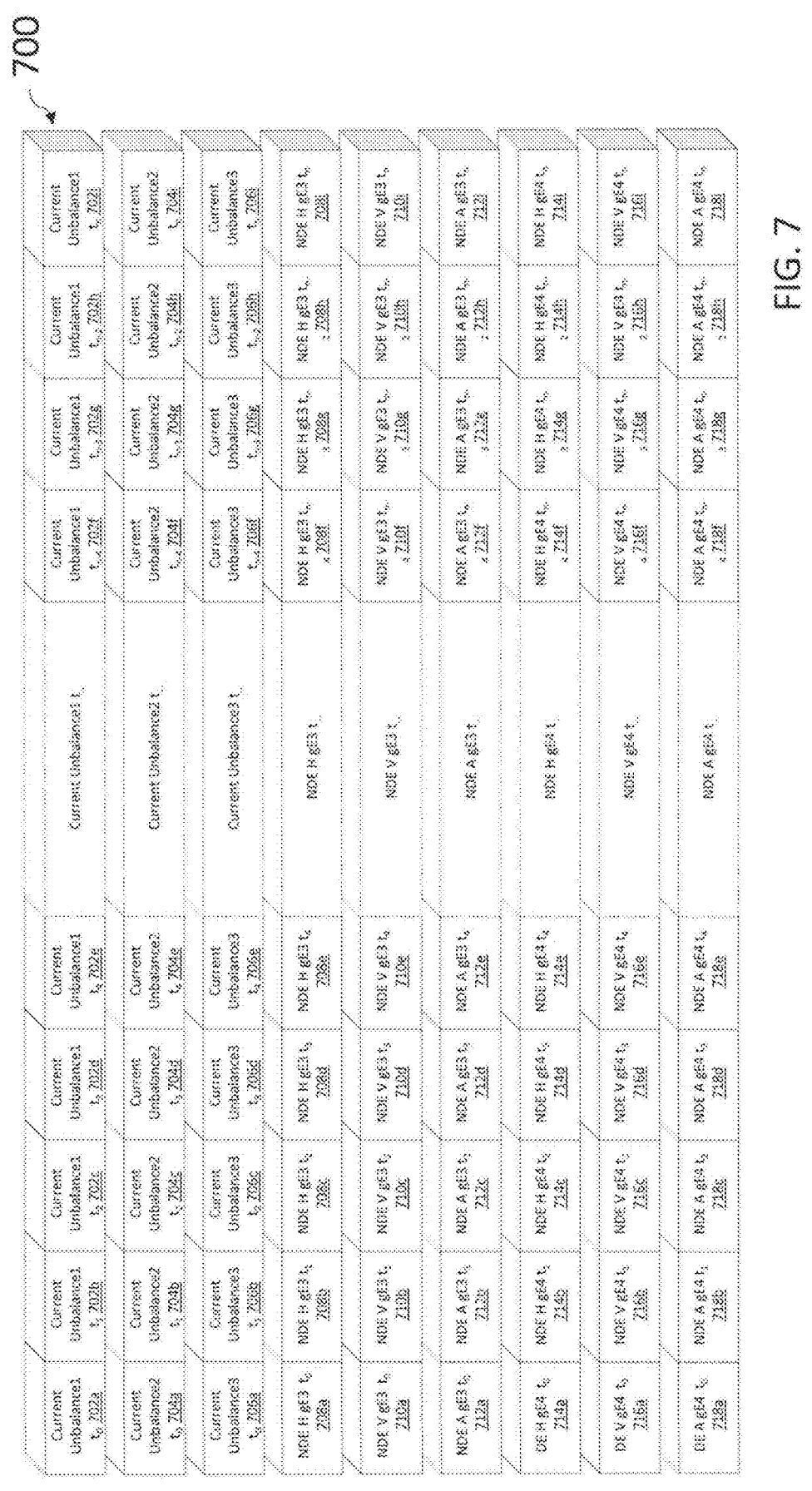

FIG. 7 illustrates an exemplary data structure storing a time zero characterization 700 of a rebuilt motor under test based on derived values obtained by processing time sampled data obtained during a first run of a rebuilt motor under test. In embodiments, derived values like those constituting time zero characterization 700 may be generated by an integrator, e.g, 406, or such derived values may be generated by a remote processing device operating on data stored a in remote data store after integrator, e.g., 406, transmits test results, e.g., 454, to a remote processing device. The exemplary time zero characterization 700 illustrated in FIG. 7 comprises a data structure organized by derived data type in a time sampled sequence relative to t0 (e.g, a time of a test trigger). The time zero characterization 700 further includes a set of time correlated derived values extending from time zero (t0) samples to test completion samples (tn). Exemplary time zero characterization 700 includes a set of time correlated current unbalance1 data samples 702a-702i, a set of correlated current unbalance2 data samples 704a-704i, a set of time ime correlated current unbalance3 data samples 706a-706i, a set of time correlated NDE horizontal enveloped acceleration data samples 708a-708i, a set of time correlated NDE vertical enveloped acceleration data samples 710a-710i, a set of time correlated NDE axial enveloped acceleration samples 712a-712i, a set of time correlated DE horizontal enveloped acceleration data samples 714a-714i, a set of time correlated DE vertical enveloped acceleration data samples 716a-716i, a set of time correlated DE axial enveloped acceleration samples 718a-718i. Upon reading this disclosure, one will appreciate that these various sensed data samples and derived values constituting time zero characterizations 500, 600, and 700 are by way of example only, and non-limiting, as one will appreciate that conformance test requirements may vary from motor to motor.

FIG. 8 illustrates an exemplary processing 800 in accordance with this disclosure. In a first step 802, a rebuilt motor, e.g., 102, is disposed in a motor test stand, e.g., 104. At step 804, a plurality of sensors, e.g, 250a-250c, 252a-252c, 254, 256, 256, 260a-260c, are disposed on the rebuilt motor. In embodiments, a motor, e.g., 102, is one of a number of motors of a particular type, each intended to be tested in a same manner such that a plurality of sensors are disposed in predetermined locations for a motor of a same type as a motor disposed in a motor test stand. In step 806, a set of test parameters, e.g., 454, is received from a remote processing device, e.g., 140, 112. The set of test parameters, e.g., 454, may include one or more of a rotational speed parameter, a vibrational sensor parameter, and a temperature parameters. In embodiments, a test completion parameter is further received among the set of test parameters. In step 808, a rebuilt motor, e.g., 102, is placed into an on-state causing rotational motion in a shaft, e.g., 230, of a rebuilt motor, and in step 810 sensor data, e.g., 504a-504i, 502a-502i, 506a-506i, 508a-508i, 510a-510i, 512a-512i, 514a-514i, from a plurality of sensors disposed on a rebuilt motor under tests are received. In embodiments, received sensor samples are received into an integrator, e.g., 406, for processing, storing, and transmission as described herein. In step 812, it is determined that a rotational speed of a shaft of a rebuilt motor under test satisfies a rotational speed parameter. In embodiments a determination that a rotational speed satisfies a rotational speed parameter triggers sampling and storing sensor data from a plurality of sensor channels in a time zero characterization data structure, e.g., 500, 600, or 700, in step 814. In step 816 one or more derived data values are generated based on raw sampled data obtained from a plurality of sensors. In step 818, stored sample data, e.g., 500, 600, is transmitted to a remote processing device for storage in a persistent remote data store. In a step 820, stored time correlated derived data values, e.g., 700, are transmitted to a remote processor for storage in a persistent remote data store, e.g., 130. In step 822, a display is generated comprising a plurality of indicators corresponding to one or more test parameters; such a generated display may be displayed on one or more user display devices coupled to a processing device.

Figure 9:
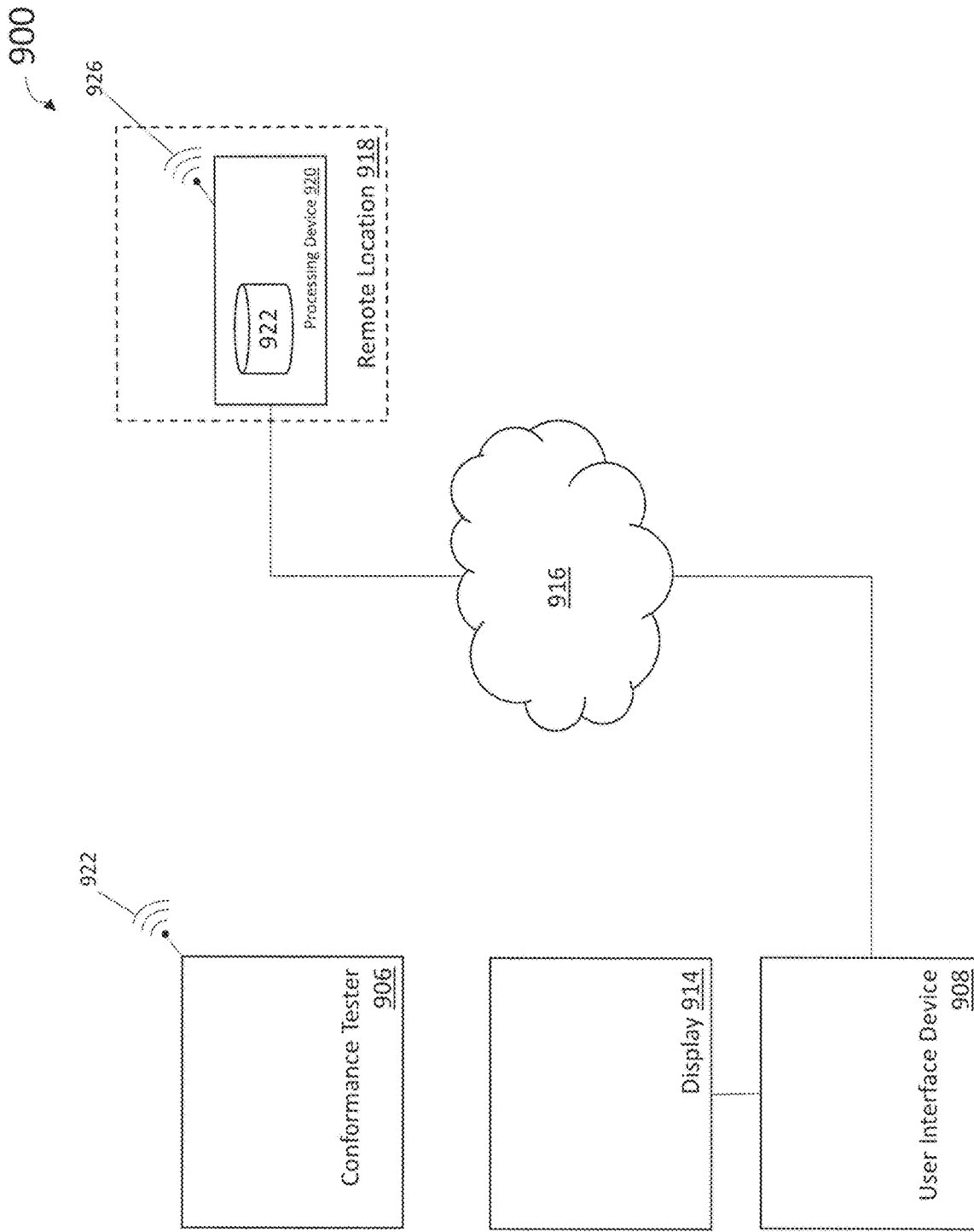
FIG. 9 is a functional block diagram illustrating aspects of a rebuilt motor test stand in accordance with this disclosure.

FIG. 9 illustrates aspects of 900 one exemplary embodiment of a conformance test apparatus in accordance with this disclosure. In embodiments, a user interacts with an exemplary conformance test device 906 via a user interface device 908 comprising a display 914. A user may interface via network 916 with a web service provided by a remote processing device 920 in a remote location 918 to interface to conformance test device 906. Remote processing device 920 includes a wireless transceiver 926 configured to communicate wirelessly with a conformance test device 906. It will be appreciated that the configuration illustrated in FIG. 9 is by way of example only, and many network configurations are possible for wirelessly interfacing with conformance test device 906. In the exemplary configuration illustrated in FIG. 9 a user configures test parameters using user interface processing device 908 to access a test setup web service for defining conformance test parameters. Once completed, remote processing device 920 transmits test parameters to a conformance test device 906. When a conformance test device 906 performs a conformance test of a rebuilt motor, conformance test device transmits a set of test results to remote processing device 920 for storage in persistent data storage 922. In embodiments, user interface processing device 908 is configured to receive conformance test results and display them in real time upon a user display 914.

Figure 10:
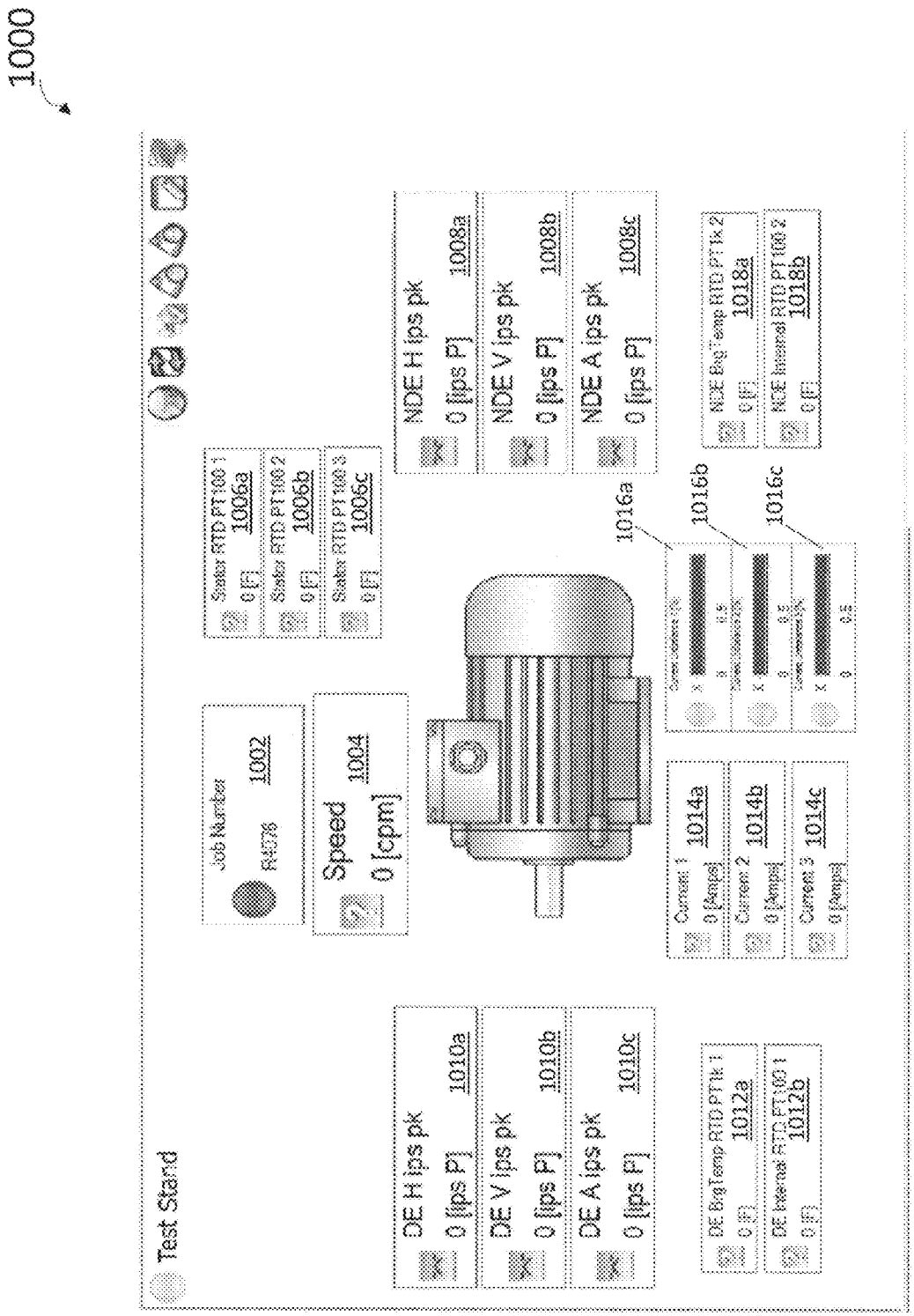
FIG. 10 is an illustration of an exemplary display of a rebuilt motor test stand in accordance with this disclosure.

FIG. 10 illustrates aspects one exemplary rebuild shop user display configured to display real time test values obtained from an exemplary conformance test results. Display 1000 displays a job number 1002 that is specific to a particular motor under test, in embodiments a job number is stored on connection with a time zero data structure, e.g., 500, 600, 700. In embodiments a particular motor unique identifier is also stored with test results, while in other embodiments a unique motor is identifiable by a job number. Display 1000 further displays a current speed 1004, stator temperatures 1, 2, and 3, 1006a-1006c, vibrational movement of a drive end, 1010a-1010c, and vibrational movement of a non-drive end 1008a-1008c. Display 1000 further displays drive end bearing temperature 1012a and an internal sensed temperature 1012b as well as a non-drive end bearing temperature 1018a and a non-drive end internal temperature 1018b. And display 1000 further illustrates a current measured on each of power cables carrying three phases of motor drive current, 1014a-1014c, and derived current unbalance values 1016a-1016c.

One important aspect of electric motor testing is validation of the inductor winding. Defects in windings may arise in current unbalance measurements. Typically, conformance test parameters require less than 5% current unbalance. In embodiments, voltage unbalance is measured instead of current unbalance. In embodiments voltage unbalance must be less than 2%. In other embodiments, voltage unbalance of less than 1% is required. In embodiments current unbalance is tested in accordance with IEEE-6018. In embodiments, a display is configured to provide an indicator indicating concern when voltage unbalance is between 2%-3.5%, and indicates an alarm condition for unbalance above 3.5%. However, some winding configurations prohibit balanced currents, and in such a case a test parameter may allow for unbalance up to 10% or 20% as acceptable in those circumstances. Upon reading this disclosure, one will appreciate that various alarm levels, warning levels, and indicators can be configured according to a testing specification required by a particular conformance test.

Figure 11:
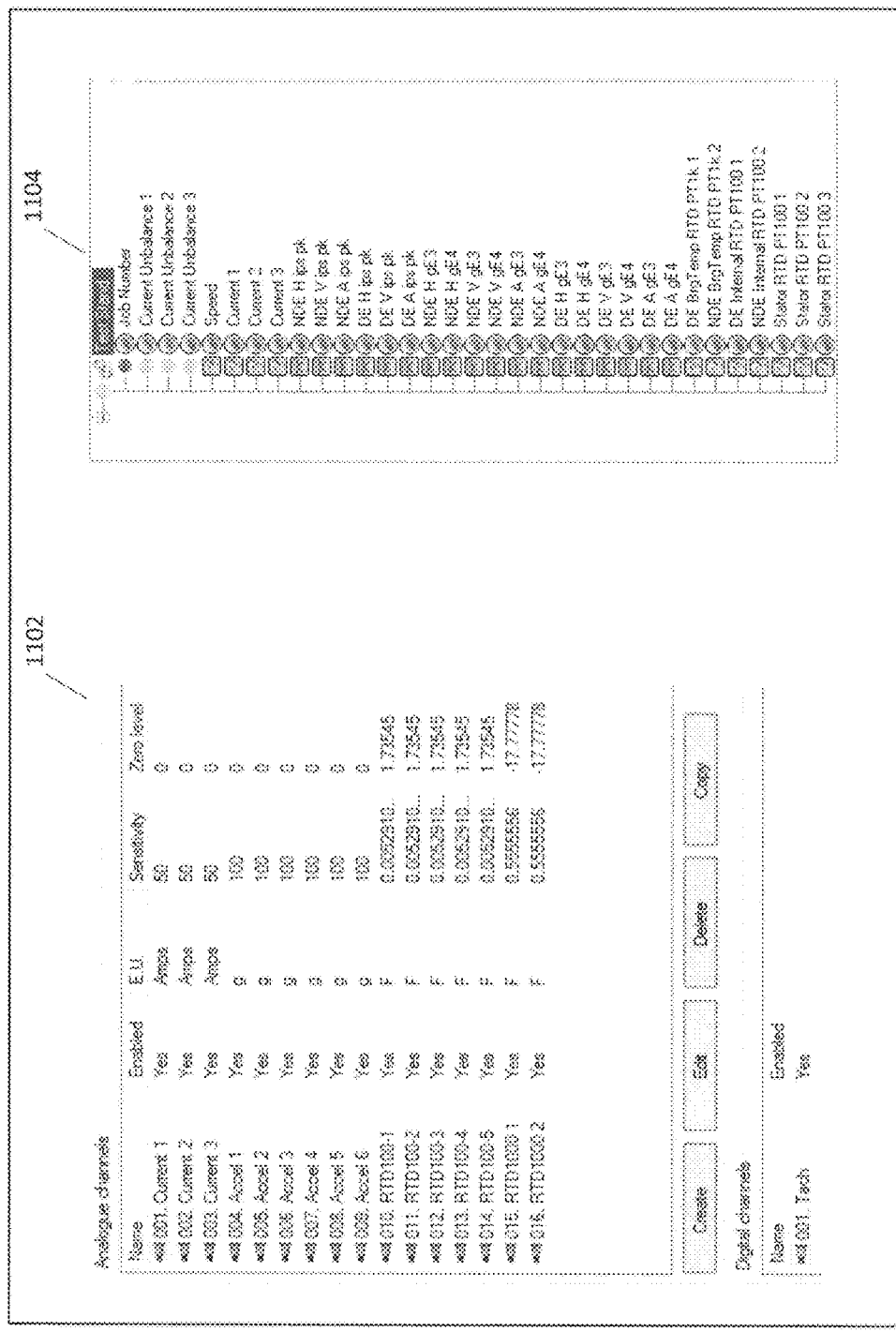
FIG. 11 is an illustration of an exemplary user interface display of a rebuilt motor test stand in accordance with this disclosure.

FIG. 11 illustrates aspects 1100 of a user interface in accordance with this disclosure. Interface 1002 allows a user to define a set input channels on a particular conformance test apparatus, and allows a user to define whether a channel is enabled, what units apply to sensed data on a respective channel, a sensitivity, and a zero level input for a particular channel. Interface 1104 allows a test to be configured from a set of input channels. For example, a test configuration includes a job number, various derived values, such as current unbalance, or enveloped acceleration values, and various sampled data to be captured during a particular test run. In practice, enveloped acceleration values provide strong indicators of bearing and lubrication conditions.

Figure 12:
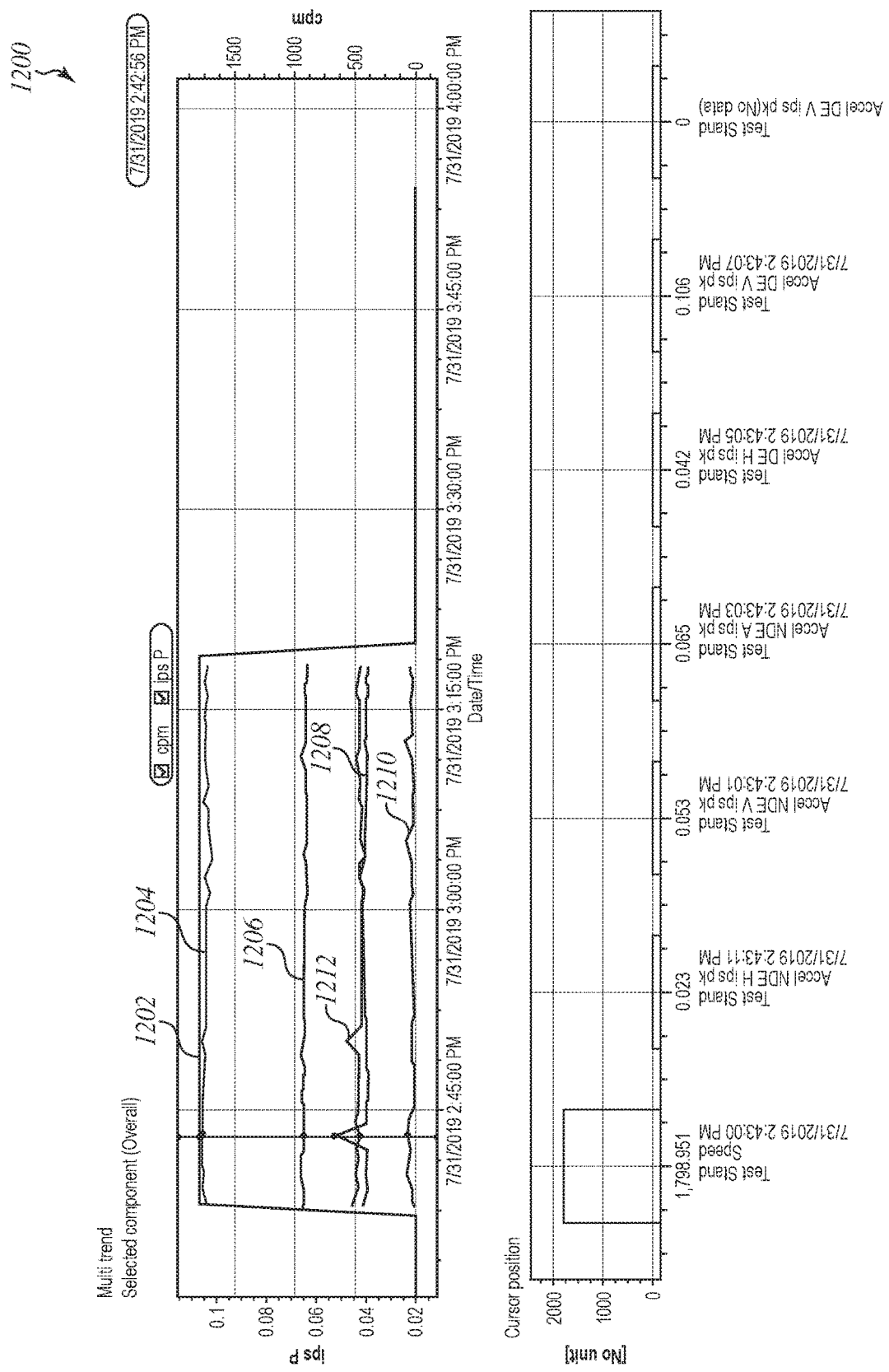
FIG. 12 is an illustration of an exemplary user interface display of a rebuilt motor test stand in accordance with this disclosure.
Figure 13:
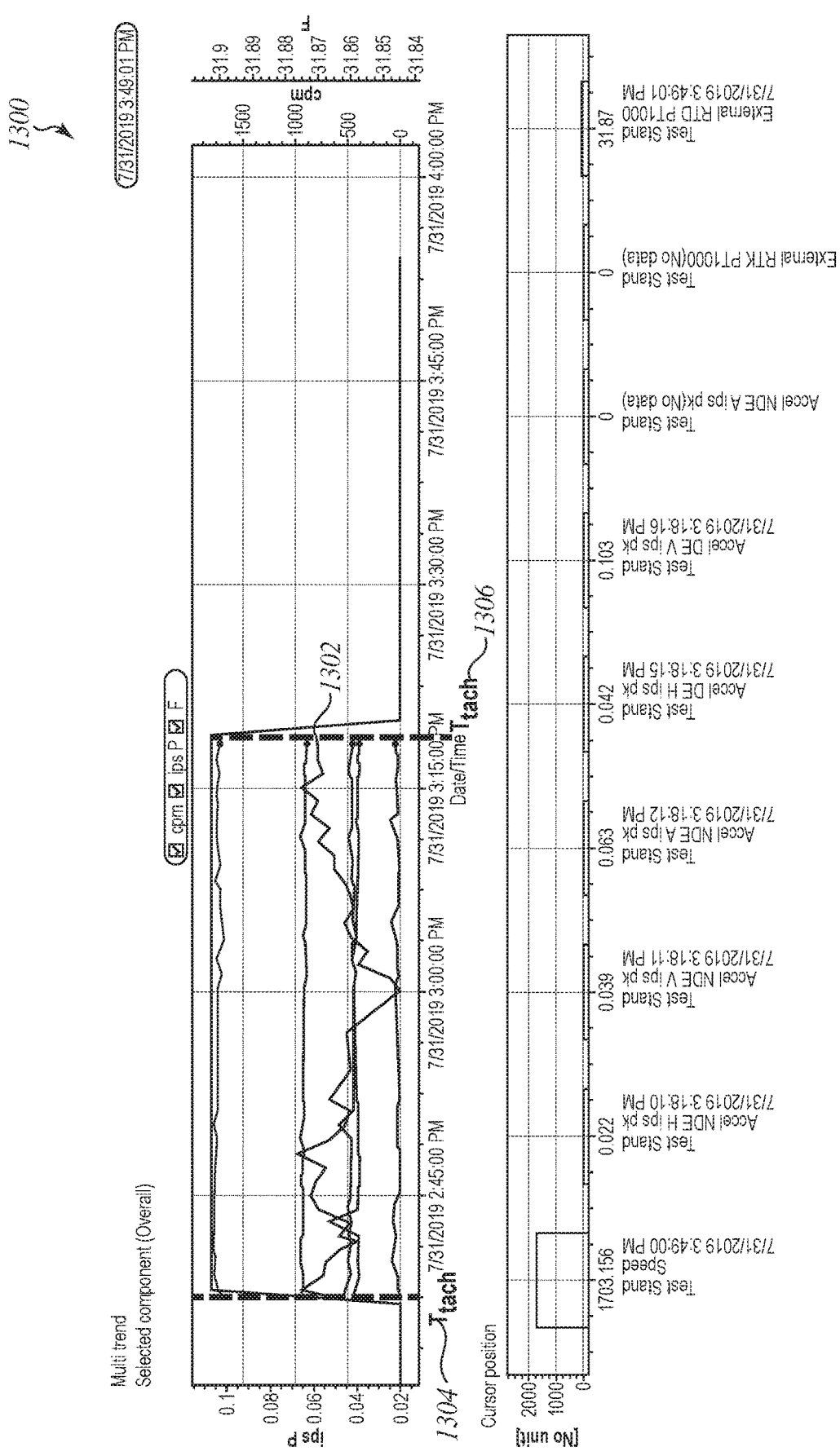
FIG. 13 is an illustration of an exemplary user interface display of a rebuilt motor test stand in accordance with this disclosure.
Figure 14:
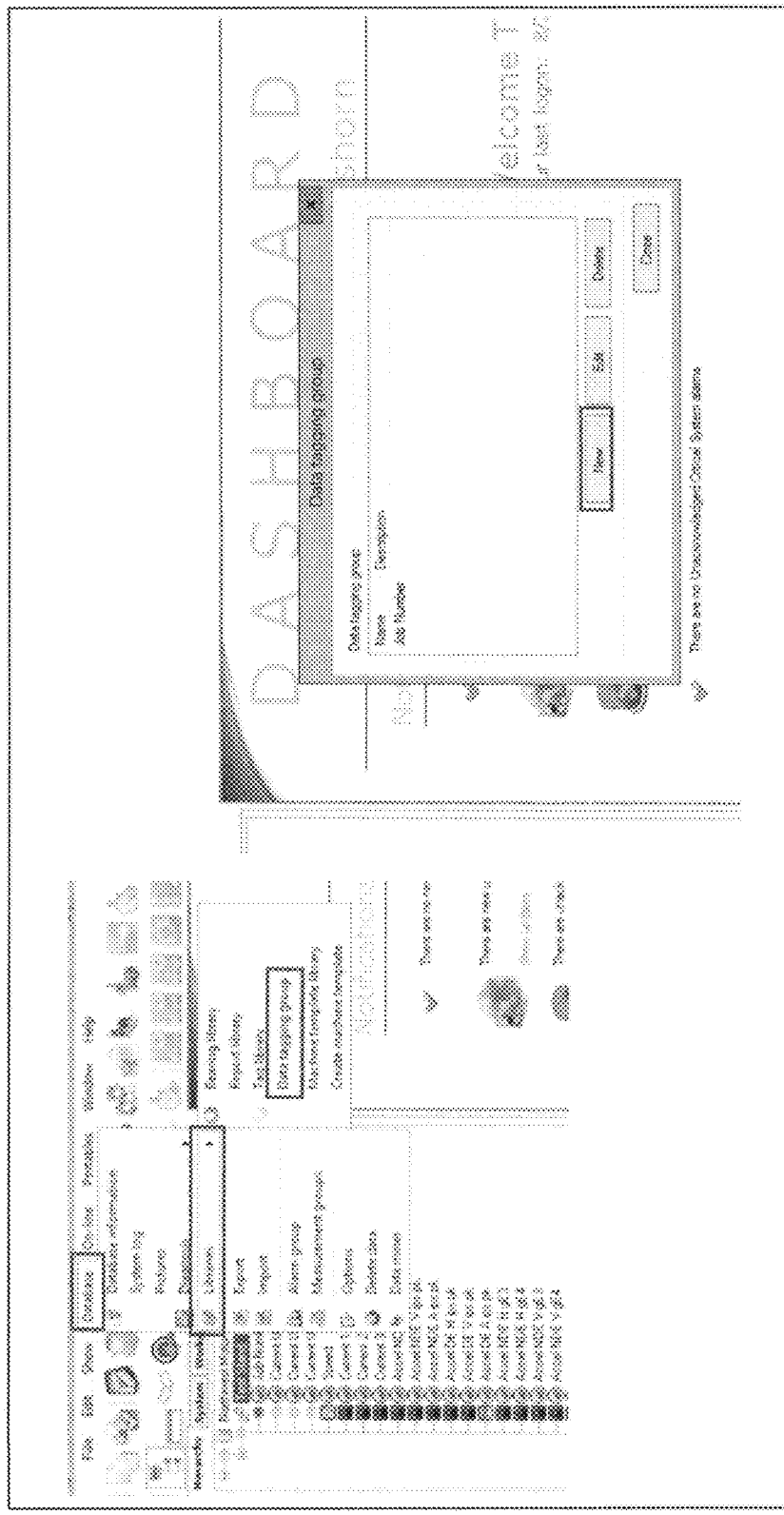
FIG. 14 is an illustration of an exemplary user interface display of a rebuilt motor test stand in accordance with this disclosure.

FIG. 12 illustrates aspects 1200 of a user interface in accordance with this disclosure. Once initial test run data is captured and stored as a time zero data structure, it may be retrieved and analyzed. FIG. 12 illustrates a multi-domain time series plot of sampled data of a test running from approximately 2:30 pm on Jul. 31, 2019 until approximately 3:20 pm on Jul. 31, 2019, and testing for speed 1202, NDE horizontal acceleration 1210, NDE vertical acceleration 1208, NDE axial acceleration 1206, DE horizontal acceleration 1212, DE vertical acceleration 1204, and DE axial acceleration. FIG. 13 illustrates aspects 1300 of a user interface in accordance with this disclosure. Like FIG. 12, FIG. 13 illustrate a multi-domain time series plot of sample data, and further includes a plot of sensed temperature 1302 sensed by a surface mounted PT-100 type RTD sensor. In such an example, the plotted sensed and sampled data contains a set of samples extending from a $T_{tach}$ 1304 to a $T_{temp}$ 1306, which respectively correspond to a period of time between when a sensed rotational speed exceeds a threshold specified by a first test parameter and when a sensed temperature is determined to be stable, e.g., for a number of samples specified according to a second test parameter. As can be seen from the plot of 1302 temperature fluctuates significantly over the course of an initial test run until it stabilizes at the end of the exemplary test run. FIG. 14 illustrates additional aspects 1400 of an interrelated embodiment in which collected data may be stored, and retrieved, and subsequently tagged with additional data. In embodiments a job number may be applied to a particular test run after data has been gathered and stored in accordance with this disclosure.

Figure 15:
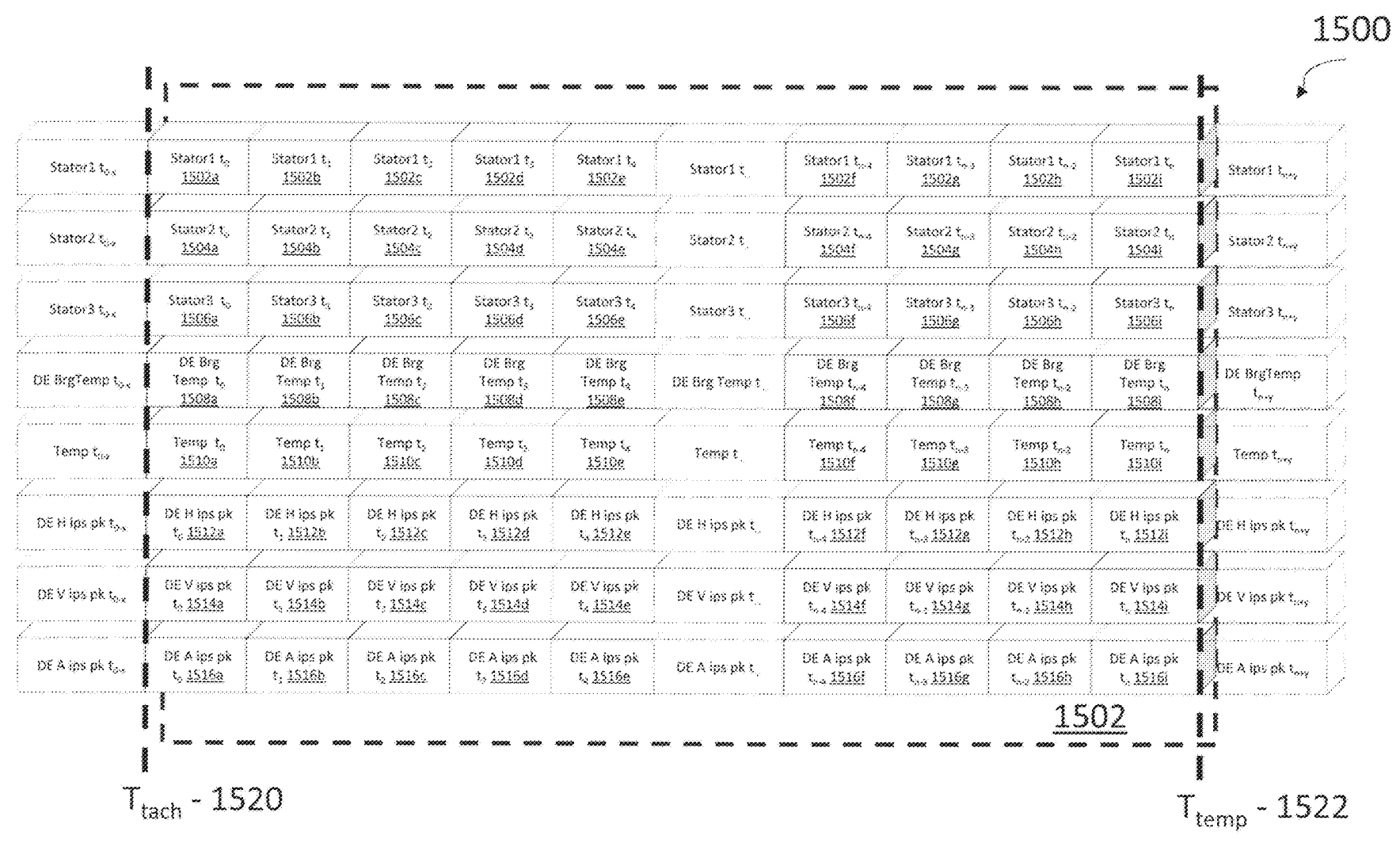

FIG. 15 illustrates various aspects 1500 of an exemplary data structure storing a time zero characterization in accordance with this disclosure. The exemplary time zero characterization illustrated in FIG. 15 comprises a data structure 1502 organized by sensor data channel. The time zero characterization comprises a set of time zero (t0) sensor samples 1502a, 1504a, 1506a, 1508a, 1510a, 1512a, 1514a, and 1516a. The time zero characterization further includes a data structure 1502 comprising a set of time sampled sensor data extending from time zero ($t_0$) samples to test completion samples ($t_n$). Exemplary data structure 1502 includes a set of time sampled first stator temperature data samples 1502a-1502i, a set of time sampled second stator temperature samples 1504a-1504i, a set of time sampled third stator temperature data samples 1506a-1506i, a set of time sampled DE bearing temperature data samples 1508a-1508i, a set of motor surface mounted temperature data samples 1510a-1510i, a set of time sampled DE horizontal vibration samples 1512a-1512i, a set of time sampled DE vertical vibrational samples 1514a-1514i, and a set of time sampled DE axial vibrational samples 1516a-1516i. In embodiments, data structure 1502 may be created responsive to a flag raised by an exemplary integrator upon determining that rotational motion exceeds a threshold at Ttach 1520 and may be completed upon an exemplary integrator raising a flag at Ttemp 1522 when an exemplary integrator determines that a sensed temperature is stable, or alternatively, when all sensed temperatures are stable.

The exemplary data structure 1502 illustrated in FIG. 15 may, for example, be generated by one or more exemplary embodiments of a conformance testing apparatus, e.g., conformance tester 106, or conformance tester 206, or 300. Such a data structure may be generated by various embodiments of an integrator, e.g., 406, 324, 206a, and subsequently transmitted to a remote location. In other embodiments, individual data samples, e.g., 1502a, 1504b, 1512d, may be sampled and transmitted to a remote location in real time, and a data structure such as that illustrated in FIG. 15 may be generated at a remote location. In some embodiments, whether such a data structure is first generated by an integrator or generated at a remote location, no data is sampled and stored prior to a sensed tachometer signal, e.g., 502, indicates that a threshold rotational speed has been exceeded. And in some embodiments, no data is sampled and stored after $t_n$ when a stable temperature has been achieved—although in some embodiments some number samples following $t_n$ may also be sensed and stored (or particularly illustrated here, but for example, 5 seconds worth, 10 seconds worth, 30 seconds worth or 1 minutes worth or 2 minutes worth or 30 minutes worth) as part of an exemplary data structure, e.g., 1502.

In other embodiments, samples are sensed and stored, or transmitted, continuously such that samples of signals 1502, 1504, 1506, 1508, 1510, 1512, 1514, 1516 are sampled before t0 and after tn as illustrated. When it is determined that a rotational speed of the motor has exceeded a threshold, e.g. at $T_{tach}$ 1520, in some embodiments, a time Ttach associated with that determination is determined and stored. Similarly, when it is determined that temperature has become stable in accordance with this disclosure, e.g., at $T_{temp}$ 1522, a time $T_{temp}$ may be determined and stored. In embodiments where data is sampled stored continuously by an integrator, instructions may cause an integrator to create a data structure 1502 following a conformance test run by retrieving and assembling desired data samples extending from Ttach 1520 until Ttemp 1522 (recognizing that in some embodiments, a number of additional samples may be incorporated from time before Ttach 1520 or after time Ttemp 1522). In other embodiments, sensed data is transmitted to a remote location together with time stamp information regarding Ttach 1520 and Ttemp 1522, and a remote location assembles data structure 1502 from the transmitted data.

While described above, and throughout, with respect to motors generally with a focus on electric motors, techniques, systems, apparatus, and methods in accordance with this disclosure are also generally applicable to rebuilt gear boxes, generators, or any machinery involving rebuilt rotational mechanisms.

In one exemplary embodiment, an apparatus for conformance testing of a rebuilt electric motor comprises a housing, an integrator disposed within the housing and comprising a plurality of inputs. The apparatus includes a plurality of sensors including a first single axis mass accelerometer coupled to a first cable communicably coupled to a first input of the plurality of inputs; a second single axis mass accelerometer coupled to a second cable communicably coupled to a second input of the plurality of inputs; a third single axis mass accelerometer coupled to a third cable communicably coupled to a third input of the plurality of inputs; a fourth single axis mass accelerometer coupled to a fourth cable communicably coupled to a fourth input of the plurality of inputs; a fifth single axis mass accelerometer coupled to a fifth cable communicably coupled to a fifth input of the plurality of inputs; a sixth single axis mass accelerometer coupled to a sixth cable communicably coupled to a sixth input of the plurality of inputs; a first surface mountable resistive temperature detector communicably coupled to a seventh cable coupled to a seventh input of the plurality of inputs; a second surface mountable resistive temperature detector communicably coupled to an eighth cable coupled to an eighth input of the plurality of inputs; a first current transformer coupled to a ninth cable communicably coupled to a ninth input of the plurality of inputs; a second current transformer coupled to a tenth cable communicably coupled to a tenth input of the plurality of inputs; a third current transformer coupled to an eleventh cable communicably coupled to an eleventh input of the plurality of inputs; a tachometer coupled to a twelfth cable communicably coupled to a twelfth input of the plurality of inputs.

An exemplary integrator includes a transceiver communicably coupled to one or more processors, the one or more processors communicably coupled to one or more non-transitory data stores storing instructions. Exemplary instructions are configured to, when retrieved and executed by the one or more processors, cause the one or more processors to perform operations comprising: receiving, via the transceiver, a set of test parameters comprising at least one temperature parameter and at least one rotational speed parameter, the set of test parameters corresponding to a conformance test; receiving, from the twelfth input, a tachometer signal indicative of a rotational speed of a motor under test; receiving, from the seventh input, a first temperature signal indicative of a first temperature of a first bearing housing; receiving, from the seventh input, a second temperature signal indicative of a second temperature of a second bearing housing; determining that a rotational speed of the motor under test satisfies the at least one rotational speed parameter; determining that the temperature of either the first bearing housing or the second bearing housing satisfies the at least one temperature parameter; transmitting, via the transceiver, a set of time correlated data comprising samples received by the one or more processors during a first period of time between the step of determining that the rotational speed of the motor under test satisfies the at least one rotational speed parameter and the step of determining that either the temperature of the first bearing housing or the second bearing housing satisfies the at least one temperature parameter, the set of time-series data samples received by the one or more processors are received from the first input, the second input, the third input, the fourth input, the fifth input, the sixth input, the seventh input, the eight input, the ninth input, the tenth input, the eleventh input, and the twelfth input.

In another interrelated apparatus for conformance testing of a rebuilt electric motor one or more of a first cable, a second cable, a third cable, a fourth cable, a fifth cable, and a sixth cable are communicably coupled to a respective one of a first input, a second input, a third input, a fourth input, a fifth input, and a sixth input through an intermediate circuit.

In another interrelated apparatus for conformance testing of a rebuilt electric motor the intermediate circuit is one or more of a buffer, a filter, an A/D converter, a transformer, a circuit breaker, a signal conditioner, an amplifier, or an optoelectric converter.

In another exemplary interrelated apparatus for conformance testing of a rebuilt electric motor (or rebuilt gear boxes, generators, or any machinery involving rebuilt rotational mechanisms), the operations further comprise: storing, during the first period of time, the set of time correlated data samples in at least one memory or in at least one of the one or more non-transitory data stores, wherein transmitting, via the transceiver, the set of time correlated data stores occurs responsive to determining that the temperature of either the first bearing housing or the second bearing housing satisfies the at least one temperature parameter, and includes retrieving the set of time correlated data samples from the at least one memory or the at least one of the one or more non-transitory data stores.

In another exemplary interrelated apparatus for conformance testing of a rebuilt electric motor, transmitting, via a transceiver, a set of time correlated data samples occurs continuously during the first period of time, each individual time correlated data sample being transmitted as it is received by the one or more processors.

In another exemplary interrelated apparatus for conformance testing of a rebuilt electric motor, a set of time correlated data samples includes subsets of time correlated data samples allocated to a plurality of data channels, each data channel associated with at a respective input of the plurality of inputs.

In another exemplary interrelated apparatus for conformance testing of a rebuilt electric motor, a set of time correlated data samples is transmitted during the transmitting operation to a remote data store, and the remote data store is configured to: store a set of time correlated data samples; and provide the set of time correlated data samples to a requesting data user.

In another exemplary interrelated apparatus for conformance testing of a rebuilt electric motor a processing device is coupled to a display comprising a plurality of indicators, each respective indicator corresponding to a respective one of the test parameters of the set of test parameters, the processing device configured to retrieve the wherein when at least one respective one of the test parameters is satisfied the operations are further configured to a corresponding indicator of the plurality of indicators is altered.

In another exemplary interrelated apparatus for conformance testing of a rebuilt electric motor a remote data store is further configured to store a time correlated data sample in a data structure further configured to store a unique identifier of the motor under test or of the test to serve as a time zero characterization of the rebuilt electric motor.

In another exemplary interrelated apparatus for conformance testing of a rebuilt electric motor the remote data store is further configured to store a time correlated data in an indelible data repository. In some embodiments, an indelible repository is a block chain based repository.

In another exemplary interrelated apparatus for conformance testing of a rebuilt electric motor a set of time correlated data samples includes samples received either (i) before the determining the rotational speed of the motor under test satisfies the at least one rotational speed parameter or (ii) after the determining that the temperature of either the first bearing housing or the second bearing housing satisfies the at least one temperature parameter.

In another exemplary interrelated apparatus for conformance testing of a rebuilt electric motor a housing is configured to receive three-phase power cables of a motor under test into a housing, and a first current transformer, a second current transformer, and a third current transformer are disposed within the housing and configured to provide three voltages indicative of a three-phase power drive current of the motor under test.

In another exemplary interrelated apparatus for conformance testing of a rebuilt electric motor, the apparatus includes a motor test stand; the motor under test disposed within the motor test stand; a display configured to display results of a conformance test of the motor under test, the results including one or more indicators corresponding to respective ones of the set of test parameters; a first single axis mass accelerometer is disposed on a first predetermined location of a drive end of the motor under test and configured to measure vibration along a first axis; a second single axis mass accelerometer is disposed on a second predetermined location of the drive end of the motor under test and configured to measure vibration along a second axis; a third single axis mass accelerometer is disposed on a third predetermined location of a drive end of the motor under test and configured to measure vibration along a third axis; a fourth single axis mass accelerometer is disposed on a first predetermined location of a non-drive end of the motor under test and configured to measure vibration along the first axis; a fifth single axis mass accelerometer is disposed on second predetermined location of the non-drive end of the motor under test and configured to measure vibration along the second axis; a sixth single axis mass accelerometer is disposed on third predetermined location of the non-drive end of the motor under test and configured to measure vibration along the third axis; a first surface mountable resistive temperature detector is disposed on at least one bearing housing of the motor under test; a second surface mountable resistive temperature detector is disposed on at least one bearing housing of the motor under test; a first current transformer is disposed on a first power cable bearing a first phase of a three-phase drive current of the motor under test; a second current transformer is disposed on a second power cable bearing a second phase of the three-phase drive current of the motor under test; a third current transformer disposed on a third power cable bearing a third phase of the three-phase drive current of the motor under test; and a tachometer is operatively coupled a shaft of the motor under test and configured to sense the rotational speed of the motor under test In another exemplary interrelated apparatus for conformance testing of a rebuilt electric motor computer processor operations include receiving a test begin signal; and issuing a motor start signal initiating rotational motion of a shaft of the motor under test.

In another exemplary interrelated apparatus for conformance testing of a rebuilt electric motor, further comprises a protective shield; a motor under test disposed within the protective shield, the motor under test comprising at least one stator and at least one embedded resistive temperature detector configured to measure at least one temperature of the at least one stator and a cable configured to operatively couple the at least one embedded resistive temperature detector to at least one digital input of the plurality of inputs via an intermediate circuit comprising a signal conditioner.

We claim:

1. A method of conformance testing a rebuilt motor, comprising:
    coupling a plurality of sensors from an integrator to the motor comprising:
        coupling a first vibrational sensor to a non-drive end of the motor;
        coupling a second vibrational sensor to a drive end of the motor;
        coupling a first temperature sensor to the motor; and
        coupling a first rotational speed sensor to the motor; and
    receiving, into a processing device from a remote processing device via a wireless transmitter, a set of test parameters of a conformance test including a vibrational sensor parameter enabling sensing from the first vibrational sensor, a temperature sensor parameter, and a rotational speed parameter;
    placing the motor in an on-state causing rotational motion in a shaft of the motor;
    receiving, into the processing device from the plurality of sensors, sensor data simultaneously from the plurality of sensors;
    determining, using the processing device, from rotational speed sensor data received into the processing device, that the rotational speed satisfies the rotational speed parameter by exceeding a specified rotational speed value;
    storing, using the processing device, time sampled sensor data received from the plurality of sensors relative to a time zero corresponding to a time when the rotational speed satisfies the rotational speed parameter, wherein the time sampled sensor data from the plurality of sensors includes first time sampled data from the first vibrational sensor, second time sampled from the first temperature sensor, and first rotational speed data from the first rotational speed sensor; and
    transmitting, using a transmitter communicatively coupled to the processing device, the stored time sampled sensor data to a remote processing device configured to store the stored time sampled sensor data relative to the time zero in a time zero data structure associated with a unique identifier of the motor.

2. The method of conformance testing a rebuilt motor of claim 1, wherein the motor is an electric motor comprising:
    a three-phase power input comprising:
        a first power cable;
        a second power cable; and
        a third power cable,
    wherein coupling the plurality of sensors to the motor further comprises:
        coupling a first current sensor to the first power cable;
        coupling a second current sensor to the second power cable; and
        coupling a third current sensor to the third power cable, further
    wherein storing time sampled sensor data further comprises:
    storing time sampled power sensor data from the first current sensor;
    storing time sampled power sensor data from the second current sensor; and
    storing time sampled power sensor data from the third current sensor.

3. The method of conformance testing a rebuilt motor of claim 2, wherein the specified rotational speed value is about 800 RPM.

4. The method of conformance testing a rebuilt motor of claim 2, wherein the specified rotational speed value is about 1700 RPM.

5. The method of conformance testing a rebuilt motor of claim 1, further comprising:
    generating a first time value corresponding to determining that the rotational speed-satisfies the rotational speed parameter;
    determining that a temperature sensed by the first temperature sensor satisfies the temperature sensor parameter; and
    generating a second time value corresponding to a determination that the temperature satisfies the temperature sensor parameter,
    wherein transmitting the stored time sampled sensor data further comprises:
        transmitting the first time value and the second time value together with the stored time sampled sensor data.

6. The method of conformance testing a rebuilt motor of claim 1, wherein coupling a plurality of sensors to the motor further comprises:
- coupling a second vibrational sensor to the motor;
- coupling a third vibrational sensor to the motor;
- coupling a fourth vibrational sensor to the motor;
- coupling a fifth vibrational sensor to the motor;
- coupling a sixth vibrational sensor to the motor; and
- coupling a second temperature sensor to the motor.

7. The method of conformance testing a rebuilt motor of claim 1, wherein coupling a plurality of sensors to the motor further comprises:
- coupling a first current-to-voltage transformer to a first phase power cable;
- coupling a second current-to-voltage transformer to a second phase power cable; and
- coupling a third current-to-voltage transformer to a third phase power cable.

\* \* \* \* \*